(12) United States Patent
Sampsell et al.

(10) Patent No.: US 6,995,917 B1
(45) Date of Patent: *Feb. 7, 2006

(54) PROJECTION DISPLAY SYSTEM USING POLARIZED LIGHT

(75) Inventors: Jeffrey B. Sampsell, Vancouver, WA (US); James M. Florence, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/289,327

(22) Filed: Apr. 8, 1999

(51) Int. Cl.
G02B 27/14 (2006.01)
G02F 1/1335 (2006.01)
G03B 21/26 (2006.01)

(52) U.S. Cl. .............................. 359/634; 349/9; 353/34
(58) Field of Classification Search ................ 359/618, 359/634; 349/750, 751, 9; 353/34, 37, 82
See application file for complete search history.

(56) References Cited

U.S. PATENT DOCUMENTS

| | | | |
|---|---|---|---|
| 4,127,322 A | 11/1978 | Jacobson et al. ............. 353/31 |
| 4,650,286 A | 3/1987 | Koda et al. ................ 350/331 |
| 4,836,649 A | 6/1989 | Ledebuhr et al. ........... 350/331 |
| 5,122,895 A | 6/1992 | Takanashi et al. .......... 359/247 |
| 5,153,752 A * | 10/1992 | Kurematsu et al. .......... 359/40 |
| 5,164,854 A | 11/1992 | Takanashi et al. .......... 359/256 |
| 5,200,843 A | 4/1993 | Karasawa et al. ............ 359/40 |
| 5,221,982 A | 6/1993 | Faris |
| 5,233,385 A | 8/1993 | Sampsell ..................... 355/35 |
| 5,239,322 A | 8/1993 | Takanashi et al. ............ 353/31 |
| 5,267,029 A * | 11/1993 | Kurematsu et al. .......... 358/60 |
| 5,278,680 A | 1/1994 | Karasawa et al. ............ 359/40 |
| 5,299,036 A | 3/1994 | Nicolas et al. ................ 359/40 |
| 5,303,083 A | 4/1994 | Blanchard et al. .......... 359/495 |
| 5,321,448 A | 6/1994 | Ogawa ........................ 353/34 |
| 5,381,278 A | 1/1995 | Shingaki et al. ............ 359/256 |
| 5,566,367 A | 10/1996 | Mitsutake et al. .......... 359/497 |

(Continued)

FOREIGN PATENT DOCUMENTS

EP      0 720 040 A2      12/1995

(Continued)

OTHER PUBLICATIONS

EPO Patent Abstracts of Japan, Publication No. 08304739; publication date Nov. 22, 1996; Application No. 080304127; Application Date Feb. 21, 1996. Seiko Epson Corp. Applicant; Komeno Kunio, Inventor, Title: Polarized Light Illuminator and Projection Type Display Device.

*Primary Examiner*—Ricky Mack
(74) *Attorney, Agent, or Firm*—Chernoff, Vilhauer, McClung & Stenzel

(57) ABSTRACT

A projection display system using polarized light comprises a light source for generating a light beam having at least two light components, wherein the light components are polarized and at least one of the light components is polarized differently than another of the light components. The projection display system has a projection system having a plurality of polarized light modulators, each modulator generating a light-component-specific image associated with one of the light components. The projection display system also has a projection lens for projecting an image combined from the light-component-specific images from the modulators. The present invention also provides a polarization converter for use with a light source that generates a light beam having at least two light components. The polarization converter comprises an optics array capable of separating the light beam into at least one light component having a polarization that is different than another light component.

15 Claims, 23 Drawing Sheets

U.S. PATENT DOCUMENTS

| | | | |
|---|---|---|---|
| 5,612,753 A | 3/1997 | Poradish et al. | 348/743 |
| 5,621,486 A | 4/1997 | Doany et al. | 348/756 |
| 5,626,408 A | 5/1997 | Heynderickx et al. | 353/20 |
| 5,626,409 A | 5/1997 | Nakayama et al. | 353/31 |
| 5,648,860 A | 7/1997 | Ooi et al. | 349/10 |
| 5,653,520 A | 8/1997 | Kato | 353/34 |
| 5,657,160 A | 8/1997 | Miyatake et al. | 359/487 |
| 5,658,060 A | 8/1997 | Dove | 353/33 |
| 5,666,447 A * | 9/1997 | Chuang et al. | 385/31 |
| 6,176,586 B1 * | 1/2001 | Hirose et al. | 353/31 |
| 6,273,567 B1 * | 8/2001 | Conner et al. | 349/9 |
| 2003/0048421 A1 * | 3/2003 | Du | 353/31 |

FOREIGN PATENT DOCUMENTS

| | | | |
|---|---|---|---|
| EP | 0 821 258 A2 | 7/1997 | |
| EP | 1096302 A1 * | 5/2001 | |
| JP | 03-046692 | 2/1991 | |
| JP | 03-202846 | 9/1991 | |
| JP | 07-218909 | 8/1995 | |
| JP | 10-186548 | 7/1998 | |
| JP | 11-271893 | 10/1999 | |
| JP | 11-305189 | 11/1999 | |
| JP | 11-326861 | 11/1999 | |
| JP | 2000-019326 | 1/2000 | |
| JP | 2000-091455 | 1/2000 | |
| JP | 20000752046 | * | 3/2000 |
| JP | 2000-147656 | 5/2000 | |
| JP | 2000-180792 | 6/2000 | |
| JP | 2000-267046 | 9/2000 | |

* cited by examiner

TO

PROJECTION DISPLAY SYSTEM USING POLARIZED LIGHT

BACKGROUND OF THE INVENTION

This invention relates to projection display systems which use reflective spatial light modulators, and specifically, to such systems which incorporate reflective liquid crystal devices, as well as to projection display systems which incorporate polarization converters.

1. Projection Display Systems

The system shown in FIG. 1 illustrates the essential components of the optical portion of a projection display system having three reflective spatial light modulators in the form of liquid crystal display (LCD) panels, also referred to as liquid crystal light valves (LCLV). The prior art system, depicted generally at 10 includes a light source 12, an illumination mechanism for collecting the light and concentrating it onto the light valves, shown generally at 14, a polarizing mechanism for polarizing the light, if the light valves modulate via polarization effects, shown generally at 16, a splitting mechanism for splitting the illumination into three color bands to separately illuminate the three light valves, shown generally at 18, a recombining mechanism for recombining the three light distributions after reflecting from the light valves, shown generally at 20, and a projection mechanism for projecting the combined images onto a viewing screen, shown generally at 22.

Lamp 24 and lamp reflector 26 produce and concentrate the light for this system. A series of dichroic filters 28, 30 is used to split the light from the lamp 24 into separate red, green, and blue components. The light in each of the three components, or channels, is then polarized with a polarizing beam splitter (PBS) 32, 34, 36, and illuminates three separate LCDs, 38, 40, 42. The LCDs selectively modify the polarization of the light reflected from them allowing some portion of the light to pass back through the PBS. A second series of dichroic filters, 44, 46, is used to recombine the modulated light distributions and pass them on to a projection lens 48 imaging all three LCDs onto the viewing screen.

The configuration shown in FIG. 1 is functional and has been used to implement projection display system products. However, the large number of components in this architecture is cumbersome, and necessitates a relatively large physical size of the system. The most serious drawback to these systems is the requirement of a large back working distance for the projection lens.

A single filter, or PBS plate, tilted at 45 degrees requires an optical path length equal to or greater than the active width of the LCD panel. It may be seen in FIG. 1 that two of the three channels, green and red, require a PBS and two dichroic filters. These channels require a minimum optical path length between the LCD and the projection lens of three times the active width of the LCD. The blue channel in FIG. 1 requires only one PBS and a single dichroic filter, but the path length must be equal to the other two channels for in-focus registration of all three images on the viewing screen. The actual optical path length for the projection lens must also account for the divergence of the light after reflecting off the LCD panel. This is a function of how fast the optical system is running, usually specified by the f/# of the optical system. The minimum distance referred to here is strictly valid only for systems of very high f/# and thus impractical due to low light throughput. However, for comparison with other systems this minimum figure is a good baseline. The only advantages of this architecture are the ability to optimize the color filtering with the interaction of multiple dichroic structures and the ability to optimize the PBS performance for the narrow band color channels. However, these advantages are relatively minor.

The most straightforward method of simplifying the projector architecture is to have the filter and beam splitter structures perform more than one function in the set of required system operations. System configuration 50, shown in FIG. 2, incorporates two of these simplifications. The first is the use of a single PBS 52 immediately after lamp 24, replacing the three PBS plates of the FIG. 1 system configuration. Single PBS 52 polarizes the broadband output of the lamp prior to the color splitting operation and thus functions as the amplitude modulation control mechanism for all three LCDs. This requires that the PBS function over the entire visible spectrum. The second simplification is to utilize the same set of dichroics to split the light into the three color channels and to recombine the reflected light prior to the projection optic. This requires that the dichroic filter passbands be carefully controlled since there are now only two filters 54, 56, to control the whole system colorimetry. The savings in system complexity is readily evident.

One system difficulty not addressed by the configuration in FIG. 2 is the reduction in the back working distance of the projection lens. The projection lens must still work over a distance that is a minimum of three times the active width of the LCD. A solution to this problem is found by recognizing that the operation of the dichroic filters is still the same even if the dichroic structures are crossed as shown in system 60 in FIG. 3A. This allows the back working distance to be reduced by 33% over the systems of FIG. 1 or 2, to a minimum of twice the active width of the LCD. Unfortunately, crossing plate dichroics 62, 64, introduces a problem because the operation at the intersection of the two plates is usually disrupted by the thickness of the plates, producing a seam in the middle of the image, where the images of the three LCD panels are totally or partially obscured by the plate intersection. Also, the transmission/reflection characteristics of dichroic filters are significantly different for p- and s-polarizations, which results in the color characteristics of the whole projector being difficult to control. This limitation is present in FIGS. 2, 3A and 3B.

The preceding problem is solved in system 70 of FIG. 3B by the introduction of a four piece color cube filter, shown generally at 72. Dichroic filters 74, 76 are deposited on the surfaces of the four cube segments and the pieces are then glued together to form a solid cube with the dichroics sealed in the interior across the cube diagonals. If properly assembled this arrangement eliminates most of the obstruction of the central crossover of the two dichroic layers. However, this assembly is precise and the color cube component is expensive because of the difficulty in assembly. FIG. 3B also shows the use of a polarizing beam splitter cube 78. This component is a common assembly for optical systems and is not an expensive addition due to the significantly less stringent assembly requirements.

As indicated in these system configurations, the state-of-the-art in system architectures for reflective LCDs includes several arrangements, each with particular advantages and disadvantages. A desired alternative is a system that has the small back working distance advantages of the systems shown in FIGS. 3A and 3B, without the costly addition of a precisely assembled crossed dichroic filter cube.

Jacobson et al., U.S. Pat. No. 4,127,322, is fashioned around the optically addressed Hughes liquid crystal light valve (LCLV). A lamp output is polarized by a beam splitter and then divided into the three color paths by dichroic filters.

This configuration is equivalent to the system in FIG. 2 of the prior art. The reference also includes an alternative embodiment in which an additional set of dichroic filters and three light valves are arranged to use the light normally discarded by the polarizer. This attempt to recover the unused portion of the light is intended to improve system throughput.

Koda et al., U.S. Pat. No. 4,650,286, and Ledebuhr et al., U.S. Pat. No. 4,836,649, describe architectures for the reflective LCLVs that are essentially equivalent to the system of FIG. 1, with the exception that they use a separate projection lens for each of the three light valves.

Takanashi et al., U.S. Pat. No. 5,239,322, is another system designed originally for the optically addressed LCLV type light modulators. The system covered in this patent is easily recognized as equivalent to the prior art architecture of FIG. 3B. In this system the LCLVs are illuminated with images indicated as write light distributions. CRTs are typically used to produce these write light distributions and are usually abutted directly to the corresponding light modulator.

Ooi et al., U.S. Pat. No. 5,648,860, uses two dichroic plates to separate the light into the three color channels and to recombine the light reflected from the LCDs. The angles of the plates used in this configuration are not 45 degrees and are set to try to reduce the back working distance for the projection optics. One of the primary purposes of Ooi et al. appears to be the use of positive lens elements directly in contact with the LCD panels to collimate the incoming illumination and to converge the reflected light, and the use of "cone-like" prisms to affect the matched convergence of the illuminating light. In all other aspects this system is essentially the same as that of FIG. 2.

Dove, U.S. Pat. No. 5,658,060, is a system having a set of external dichroic filters that separate the light into the three color paths. The light in each path is separately polarized before illuminating the light valves. The reflected light is recombined through a special prism arrangement, usually referred to as a Philips prism. The Philips prism is used to try to reduce the back working distance requirements of the projection lens. Although this system uses a prism for recombination, it is architecturally equivalent to the system in FIG. 1. The reference also describes another embodiment that uses a cube beam splitter for recombining the light output but continues to use separate dichroics to affect the initial split of the light into three color paths and to use separate PBSs for each light valve.

Doany et al., U.S. Pat. No. 5,621,486, describe a simple configuration for a three-panel projector. The system uses a Philips type prism to split the illuminating light and to recombine the reflections from the three LCDs. However, this setup uses a single cube polarizing beam splitter in front of the color splitting prism. This system is thus equivalent to the architecture of FIG. 3.

Sampsell, U.S. Pat. No. 5,233,385, and Poradish et al., U.S. Pat. No. 5,612,753, describe projection systems designed for the TI digital micro- mirror device (DMD) light modulator. These references include system architectures for both single panel color field sequential systems and multiple panel systems. In the multiple panel systems a color splitting prism of the Philips type is used to perform the color separation and recombination and a total internal reflecting (TIR) prism is used to get light on and off of the DMDs. In this case the system looks essentially the same as that of FIG. 3b with a TIR prism used in place of the PBS cube.

References describing transmissive light modulators include Ogawa, U.S. Pat. No. 5,321,448, and Nakayama et al., U.S. Pat. No. 5,626,409, the latter of which describes a system which is the transmissive equivalent of the system in FIG. 1. The light from the lamp is divided into the three-color paths by a set of dichroic filters. After passing through the three light valves, the modulated light distributions are recombined using a separate set of dichroic filters. The '448 reference uses a set of dichroic filters to divide the lamp output into the three-color paths, and a separate set of dichroic filters, in the form of a color cube prism, to recombine the modulated light. This later configuration is the most common architecture presently used for transmissive light valves.

2. Polarization Converters

Projection displays that are based on polarization modulating devices, such as LCDs, include as a necessary step in the LCD illumination process the polarization of the light collected from the system light source. The polarization state required is typically linear with the direction of polarization aligned to a preferred orientation of the light modulator (called the director in an LCD). A typical polarizing arrangement is shown in FIG. 9. Light from the source is passed through a PBS which consists of a pair of prisms assembled to form a cube. A special dielectric coating is deposited on the diagonal of one of these prisms and sealed between the two pieces of glass when the prisms are glued together. The dielectric coating strongly reflects light whose electric field vector is aligned perpendicular to the plane of the drawing in FIG. 9. This light is typically given the designation s-polarized. Light whose electric field vector is parallel to the plane of FIG. 9, typically called p-polarized, is strongly transmitted by the dielectric coating. The light produced by the vast majority of useful light sources is randomly polarized, consisting of an equal combination of s-polarized and p-polarized light. Thus, in a PBS, 50% of the light output reflects as s-polarized and 50% of the light transmits as p-polarized. For a single wavelength of light, it is possible to devise a coating that produces exact polarization separation, i.e., no p-polarization reflects and no s-polarization transmits. However, over the broad visible spectrum, inefficiencies of the coating structure limit the degree of polarization obtainable.

In many projection display systems, light from the system source is polarized to the direction required by the light modulators, and the remaining light, polarized perpendicular to the preferred direction, is simply discarded. This represents a substantial performance reduction since half of the light produced by the source is not useable in the system. A number of different techniques of polarization conversion have been devised in an attempt to recover the performance loss caused by the polarization process. These polarization converters, sometimes called polarization recyclers, employ various techniques to realign the polarization state of the discarded light to be parallel to the desired polarization state for the light modulators, and to add that light back into the illumination system. The setup shown in FIG. 10 implements polarization conversion using only reflection from planar mirror surfaces to accomplish the conversion. The light from a lamp is split into the s and p polarizations by the beam splitter plate (element 302). The s-polarization is oriented in the "horizontal" direction of the perspective drawing. This part of the light distribution is reflected by two mirrors (elements 325 and 326) and remains as an s-polarized distribution when it is incident on the upper part of the illumination region 308. The p-polarized distribution is initially oriented in the "vertical" direction, but reflection from mirror element 323 re-orients this polarization in the "horizontal" plane. A second reflection of this newly s-polarized distribution by mirror element 324 does not effect the direction of polarization and this distribution reaches the lower part of the illumination region 308 as an s-polarized distribution. If we assume a reasonably efficient polarizer with 100:1 polarization ratio, then the setup of FIG. 10 results in approximately 99% of the lamp output incident in the illumination region 308 with the desired, horizontally oriented, s-polarization.

The setup shown in FIG. 10 implements the polarization conversion, but it also illustrates one consideration that must always be taken into account with polarization converters. The illumination region 308 has twice the area of the illumination region that would be covered by either the s-polarized or p-polarized light distributions prior to conversion. One could certainly adjust the mirror elements 324 and 326 to cause the two sub-regions to overlap with the same area as the original lamp output. But, this adjustment would cause the angular distribution of light rays incident on the region to increase. It is a fundamental property of optical systems in general and illumination systems in particular, that, once established, the product of the illumination area and the angular extent of the illuminating rays is an invariant. In an illumination system this invariant is generally referred to as the étendue. In the optical system of FIG. 10, the étendue is established by the lamp, and is dependent on the nature of the reflector and the physical size of the arc source used in the lamp. The process of splitting the two polarization states apart with the beam splitter plate effectively produces a second source as seen by the rest of the optical system. Since the étendue is a geometrical optics property rather than a physical or wave optics property, it does not depend on polarization states. Thus, the effective second source has the same étendue as the original lamp and the total étendue in the rest of the system is twice that of the original lamp. It is clear in FIG. 10 that the net étendue is doubled since the area illuminated is doubled. In the case of adjusting the mirrors to cause the illumination region to have the same area as the original beam, the étendue doubles due to a doubling of the angular extent of the illuminating rays. In either case, the étendue of the output of a polarization converter is twice that of the input randomly polarized input.

A potential problem with this doubling is that the optics after the illumination system may not be able to handle the larger étendue. If the étendue of the rest of the optical system is equal to or greater than that of the polarization converted illumination distribution, then all of the illumination distribution is usable. In this case, the system throughput would be essentially doubled relative to a system that did not employ polarization conversion. If the étendue of the rest of the optical system is smaller than that of the polarization converted illumination distribution, then some of that light will be lost. The loss results from either overfilling the area of the usable field of view in the remaining optical system or by overfilling the numerical aperture of the remaining optics. In this case, the increase in system throughput would be less than the twofold improvement in the fully étendue matched configuration. In the extreme case where the étendue of the rest of the optical system is just matched to the étendue of the original lamp output, there would be no gain in system throughput, since all of the converted light would fall outside the usable area or numerical aperture of that optics.

The polarization converter of FIG. 10 has the advantage of being implemented with very simple components, namely a polarizing beam splitter and front surface mirrors. The disadvantage is the number of components involved—a beam splitter and four mirrors. This can lead to packaging and size problems. A much more common method of implementing polarization conversion requiring fewer components is shown in FIG. 11. In this system, a polarizing beam splitter is again used to separate the s and p polarization states. The s-state light reflected from the beam splitter surface is reflected again by a mirror (or by another polarizer reflecting s-state light) so that its propagation direction is the same as the transmitted p-state light. The s-state light is then passed through a special crystalline optical component called a half waveplate. The half waveplate is made of a material that has different refractive indices along the different directions of its crystalline structure (a characteristic called birefringence). The propagation velocity of light through the material depends on the refractive index. Light polarized in the direction of the crystal axis with the highest index will propagate slower than the light polarized perpendicular to this axis. This axis is called the principle axis of the crystal (sometimes called the extraordinary axis). If linearly polarized light enters the half waveplate with its polarization direction making an angle with respect to the principle axis, then the light can be described as the sum of a component along the principle axis and a component perpendicular to the principle axis. The component parallel to the principle axis is delayed or retarded due to the slower propagation velocity, and this delay causes the net direction of polarization of the light distribution to rotate. In the case of a half waveplate, linearly polarized light making an angle $\theta$ with the principle axis on entering the waveplate will be rotated by $2\theta$ upon exiting. If the waveplate in FIG. 11 is set to have its principle axis at 45 degrees relative to the direction of the s-polarized light, then the polarization will rotate by 90 degrees and will be parallel to the p-polarized light transmitted by the beam splitter. The illuminated object now receives only p-polarized light (within the efficiency limits of the beam splitter). It should also be clear from the figure, that the étendue of the illumination distribution at this object is again twice that of the original lamp output due to the larger illumination area.

A slight modification of this setup is shown in FIG. 12 in which the mirror and waveplate are tilted to bring the two illumination patches together. It is clear in this figure that, although the illuminated area is the same as with the original lamp, the angular extent of the illuminating rays has increased. Analysis of this distribution would reveal that the étendue has again doubled.

Another technique for polarization conversion uses a pair of polarizing beam splitters, a quarter waveplate, and a mirror. This method is illustrated in FIG. 13. The unpolarized light from a lamp is passed through one beam splitter where it is again split into its s-polarized and p-polarized components. In the configuration illustrated in FIG. 13, the s-polarized component goes directly to one region of the illuminated object. The p-polarized component of the lamp output passes into a second beam splitter where it again passes through the splitting surface. This light then passes through a quarter waveplate. A quarter waveplate, like the half waveplate described above, is a birefringent crystal that will introduce delays or retardations to the light passing through it. If linearly polarized light enters the waveplate with its direction of polarization at 45 degrees to the principal axis of the crystal, then the output light will be circularly polarized. The "handedness" of the circular polarization depends on the exact relationship between the direction of the waveplate principal axis to the light polarization, but this is not important for the polarization conversion process described here. The circularly polarized output of the waveplate then hits a mirror, where it reflects back through the waveplate. When circularly polarized light reflects from a plane mirror, the handedness (whichever direction it is) is reversed. This reflected light passes back though the quarter waveplate, where it is converted into linearly polarized light by the retardations of the birefringent crystal. However, the handedness of the circularly polarized light passing back through the crystal to the left is reversed from that of the light that exited the waveplate on its first pass. The resulting linear polarization of the light exiting the quarter waveplate to the left will therefore be perpendicular to that of the light entering the waveplate to the right. The p-polarized light that enters the quarter waveplate is thus converted into s-polarized light upon reflection from the quarter waveplate/mirror combination. This light then reflects from the polarizing surface of the second beam splitter and falls on another portion of the illuminated object. As in the previous methods of conversion, the illuminated area doubles relative to the original lamp output, or the light can be redirected to illuminate the same area with a doubling of the angular extent of the illuminating distribution. In either case, the étendue has doubled.

A practical implementation of polarization conversion in conjunction with a fly's-eye integrating illumination system is shown in FIG. 14A and the complete projector system using this illuminator is shown in FIG. 14B. The fly's-eye lens arrays are used to produce a uniform rectangular illumination distribution at the LCLV. An array of polarizing beam splitters is introduced into this setup where the first lens array brings light to focus. As can be seen in the enlargement in FIG. 14A, the PBS array consists of polarizing beam splitters and half waveplates to convert essentially all of the light to s-polarization. This conversion process is identical to that implemented by the setup in FIG. 10.

Another type of polarization converter is disclosed in Heynderickx, et al. U.S. Pat. No. 5,626,408. This patent describes a system in which cholesteric filters are used to split up the output of a lamp into the red, green, and blue color channels needed for a three-panel LCD projector. A polarization conversion technique appropriate for cholesteric filters is implemented in this system. Referring now to FIG. 1 of that patent, light from a lamp 3 is directed into an illumination system. The first element of that system is a cholesteric filter 9. Color filter 9 reflects red light with right handed circular polarization and transmits all the rest of the lamp output. The reflected red light is directed to a mirror 15 where it reflects directly back to the cholesteric filter. The reflection of the light at the mirror changes it into left handed circular polarization and this light passes through the cholesteric filter toward element 63. The next cholesteric filter 10 reflects red light with left handed circular polarization and directs that light toward element 63. All of the red light from the lamp output has now been converted into left handed circularly polarized light. Element 63 is a quarter waveplate that converts this light into linear polarization that is required by the LCD modulator 27. The blue and green portions of the lamp output are converted into left handed circular polarization in an identical process using cholesteric filters 11 and 12 for green and filters 13 and 14 for blue. Quarter waveplates 65 and 67 convert the circularly polarized distributions into the linear polarizations needed by the LCD modulators 29 and 31.

Heynderickx, et al., also disclose a composite circular polarizer for converting unpolarized light into two polarized beams. The polarized beams are then reflected by cholesteric filters toward LCD modulators.

Takanashi et al., U.S. Pat. No. 5,122,895, describe a polarization converter using a pair of cube polarizing beam splitter and a quarter waveplate/mirror component identical to that of FIG. 13. A key feature of this invention is that the quarter waveplate is made an active component by implementing it with a liquid crystal or other electro-active optical material. This allows the conversion process to be switched on and off with a control signal.

Takanashi, et al., U.S. Pat. No. 5,164,854, describe several implementations of polarization converters for a reflective LCD projection system. The implementations include a beam splitter half waveplate configuration essentially identical to that of FIG. 11 and a non-switchable quarter waveplate implementation essentially identical to that of FIG. 13. In all cases in this patent effort was made to realign components to direct the converted polarized light to a small illumination area with the corresponding increase in angular distribution of the light.

Karasawa, et al., U.S. Pat. No. 5,200,843 and Karasawa, et al., U.S. Pat. No. 5,278,680 describe implementations of all three types of converters shown in FIGS. 10–12.

Nicolas et al., U.S. Pat. No. 5,299,036, describe a projector that uses two full color LCD modulators. A beam splitter divides the light to the two modulators and one path has a half waveplate to rotate the polarization to be properly aligned with the LCD director. The rest of the optical system is involved with recombining and aligning the two projected LCD panels. Although this uses two separate modulators the concept is similar to the beam splitter/half waveplate conversion method of FIG. 11.

Blanchard, et al., U.S. Pat. No. 5,303,083, describe a polarization converter that has features of both the beam splitter/half waveplate configuration of FIG. 11 and the beam splitter/quarter waveplate configuration of FIG. 13. The light normally lost from a polarizing beam splitter is first converted into circular polarization by a quarter waveplate, reflected by a 45 degree mirror, and then passed through a second quarter waveplate to produce linear polarization in the same direction as the desired output from the beam splitter.

Shingaki et al., U.S. Pat. No. 5,381,278, and Mitsutake, et al., U.S. Pat. No. 5,566,367, describe a number of polarization conversion techniques that are essentially equivalent to the beam splitter/half waveplate method and the beam splitter/quarter waveplate method described in the previous section. These patents also describe arrays of small conversion prism structures that are used in conjunction with fly's-eye integrators in a projector illumination system. The configuration of the array of converters is similar to that of the system shown in FIG. 14.

Kato, U.S. Pat. No. 5,653,520, describes a large multisegment converter using beam splitters and half waveplates. The configuration is intended for use with large LCD panels and its multiple segments are used to achieve full conversion and uniform illumination over a large light modulator. The conversion process is identical to that of the beam splitter/half waveplate process.

Miyatake et al., U.S. Pat. No. 5,657,160, describe a method of polarization conversion that is affected purely by reflections from plane mirrors without using waveplates. The process is essentially equivalent to the process described in FIG. 10. The patent also describes an array of small converters using this process that employs internal reflections inside small prism structures. This structure is also used in conjunction with fly's-eye integrators in a projector illumination system.

All of the aforementioned polarization converters described above convert all of the light output of a lamp, in all three-color bands, into a single linear polarization state. Heynderickx et al., U.S. Pat. No. 5,626,408, mentioned as the exception above is the only patent that describes treating colors separately, but this was done only to implement the color splitting with cholesteric filters. The system described in that patent ultimately put all three-color bands into the same linear polarization state.

Accordingly, there is still a need for a projection system for reflective liquid crystal light valves that has a small back working distance for the projection lens, that has a projection path free from crossed dichroics obstructions, that has a relatively simple configuration of the components that are used to split up and recombine the three color light distributions, includes an efficient polarization converter for higher brightness applications, that is more compact than known projection systems, and that may be manufactured at a reduced cost compared to existing systems.

SUMMARY OF THE INVENTION

The present invention provides a polarization converter for use with a light source that generates a light beam having at least two light components. The polarization converter comprises an optics array capable of separating the light beam into at least two light components having different polarizations. The polarization converter has at least one or more of the following advantages. The polarization converter provides for light components having different polarizations, and increases the amount of transmitted light. In preferred embodiments of the polarization converter, the étendue of the polarization converter is no more than 3½ times, and in some embodiments only 2 times, the étendue of the light source. Certain embodiments of the invention provide for small geometries and simple optics.

The present invention also includes a method for converting light, comprising producing a light beam that is non-polarized and has at least two light components. The light is separated into at least two light components having different polarizations. Substantially all of the light beam is transmitted by the polarization converter.

The present invention further includes a projection display system for reflective light valves comprising a light source for generating a light beam having at least two light components wherein the light components are polarized and at least one of the light components is polarized differently than another of the light components. A projection system has plural polarized beam splitters and dichroic filters therein, wherein each polarized beam splitter and dichroic filter reflects at least one of the light components and transmits at least another of the light components, and a plurality of LCD panels, each LCD panel generating a light-component-specific image associated with one of the light components. In addition, the projection display system has a projection lens for projecting an image combined from the light-component-specific images from the LCDs.

In another aspect of the invention, a projection display system using polarized light comprises a light source for generating a light beam having at least two light components, wherein the light components are polarized and at least one of the light components is polarized differently than another of the light components. The display system has a projection system having a plurality of polarized light modulators, each modulator generating a light-component-specific image associated with one of the light components. The display system also has a projection lens for projecting an image combined from the light-component-specific images from the modulators.

The projection display systems of the present invention have one or more of the following advantages: a small back-working distance from the projection lens; a projection path free from crossed dichroic obstructions; a relatively simple configuration of components used to split up and recombine the three-color light distributions; compact size; and reduced manufacturing cost compared to existing systems.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

1. Projection Display System

Figure 4:
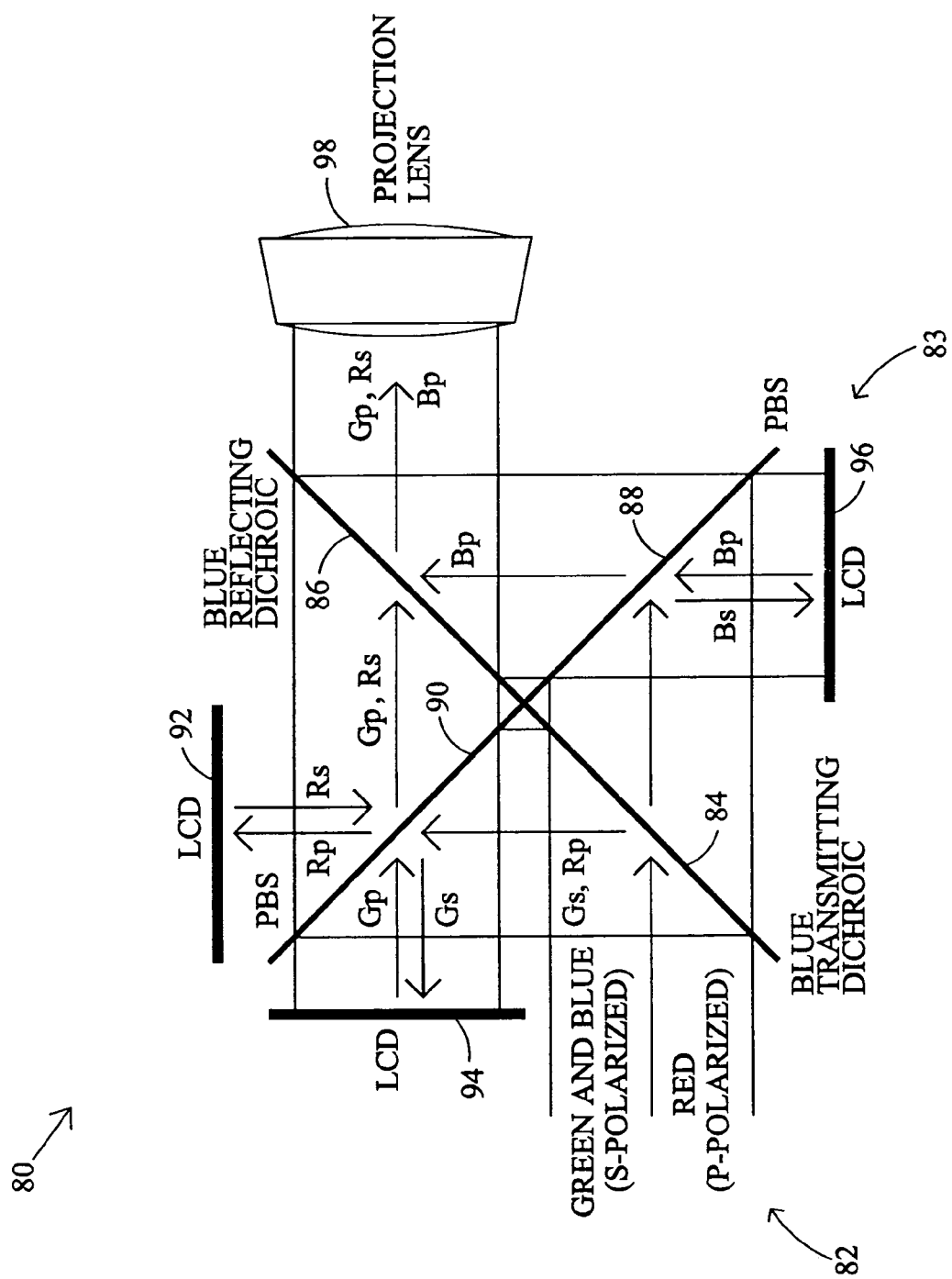
FIG. 4 is a schematic representation of the optical path of the projection system of the invention.

An exemplary embodiment of the projection display system of the present invention is shown generally at 80 in FIG. 4. System 80 includes a light source 82 and a projection system 83. Projection system 83 includes two dichroic filters (DF) 84, 86, and two polarizing beam splitters (PBS) 88, 90, to split up the incoming white light from light source 82 into red-green-blue (RGB) components before directing each light beam component to a specific light valve, or liquid crystal display (LCD), 92, 94, 96. LCDs 92, 94, 96 each provide a light-component-specific image, which is illuminated by the light beam component and reflected from the face of the LCD, carrying a color image component. The color image components are then recombined, and the reflected light is directed to projection lens 98.

A requirement for proper operation of projection system 83 is that the input illumination is pre-filtered and polarized so that the green and blue distributions are s-polarized and the red distribution is p-polarized. As is known to those of skill in the art, s-polarized light has its electric field vector linearly polarized perpendicular to the plane of the figure and p-polarized light has its electric field vector linearly polarized in the plane of the figure. The pre-filtering mechanisms will be described later herein.

DFs 84 and 86 are arranged in a substantially straight line within projection system 83, as are PBSs 88, 90. The DFs and PBSs are arranged to intersect their respective substantially straight lines adjacent the midpoints thereof in a normal relationship. Put another way, the optics are arranged in a substantially "X" shaped configuration, with the filters and beam splitters each joined adjacent an edge thereof. The coated surfaces line up in the "X" shaped configuration.

In projection system 83, the incoming light first encounters blue-transmitting dichroic filter 84. The s-polarized blue light is transmitted while the s-polarized green light and p-polarized red light are reflected. The blue light passes on to PBS 88 where, because it is s-polarized, it reflects to first LCD light valve 96, which is a blue light modulator. LCD 96 modulates the polarization of the light by rotating the direction of polarization in proportion to the electrical signals provided to the device. The reflected light is thus a combination of s-polarized and p-polarized light. When the reflected light returns to PBS 88, the s-polarized portion again reflects back toward the incoming illumination and the p-polarized portion is transmitted on to blue-reflecting dichroic 86. The blue light will reflect off second dichroic filter 86 and through projection lens 98, to an image display, such as a projection screen.

The green and red light that is reflected by first dichroic filter 84 propagates to second PBS 90. The p-polarized red light is transmitted through PBS 90 to second LCD 92, a red light modulator, while the s-polarized green light is reflected to third LCD 94, a green light modulator. LCDS 92, 94-modulate the light distributions, and after the reflected distributions return to PBS 90, only the p-polarized portion of the green light and the s-polarized portion of the red light pass over to blue-reflecting dichroic filter 86. The other portions of these two distributions are again returned toward the incoming illumination. Because dichroic filter 86 transmits both red and green, these two distributions are combined with the blue light from the other path and pass through projection lens 98 to the image display. Dichroic filter 86 acts as an image recombiner in this embodiment.

Figure 3A:
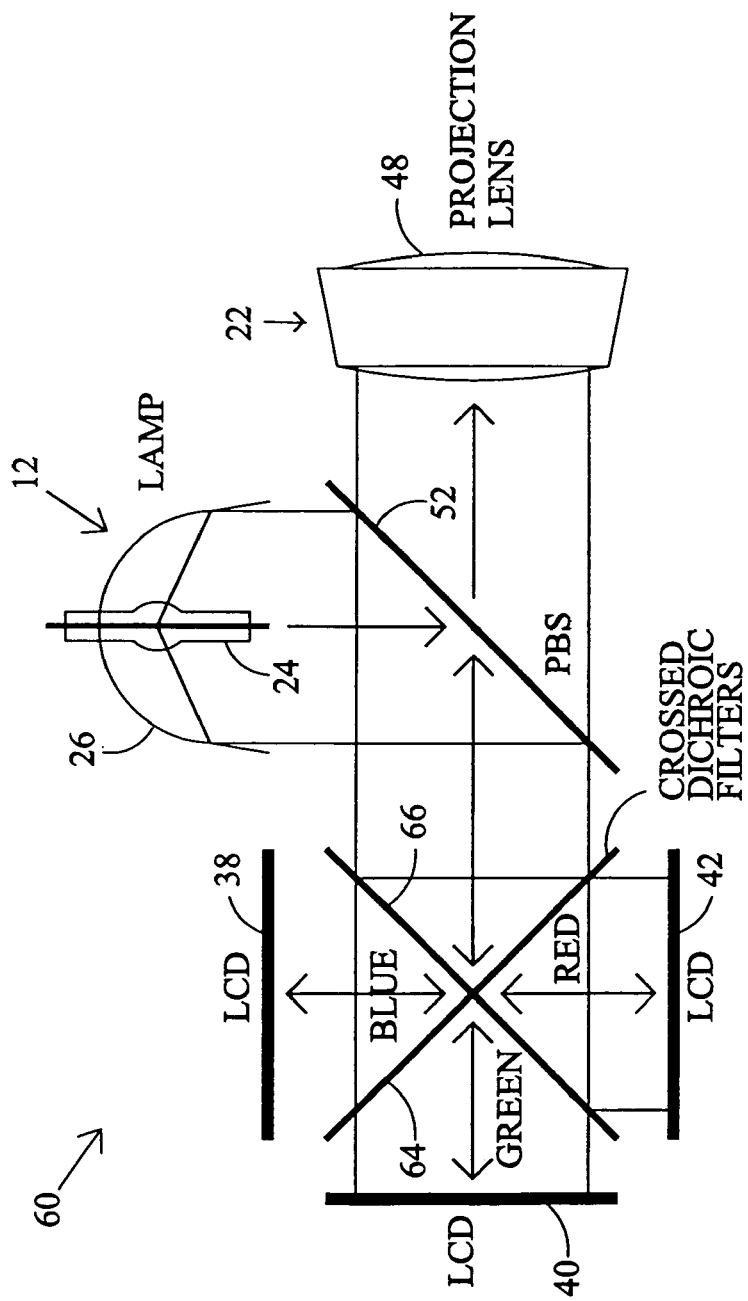
Figure 3B:
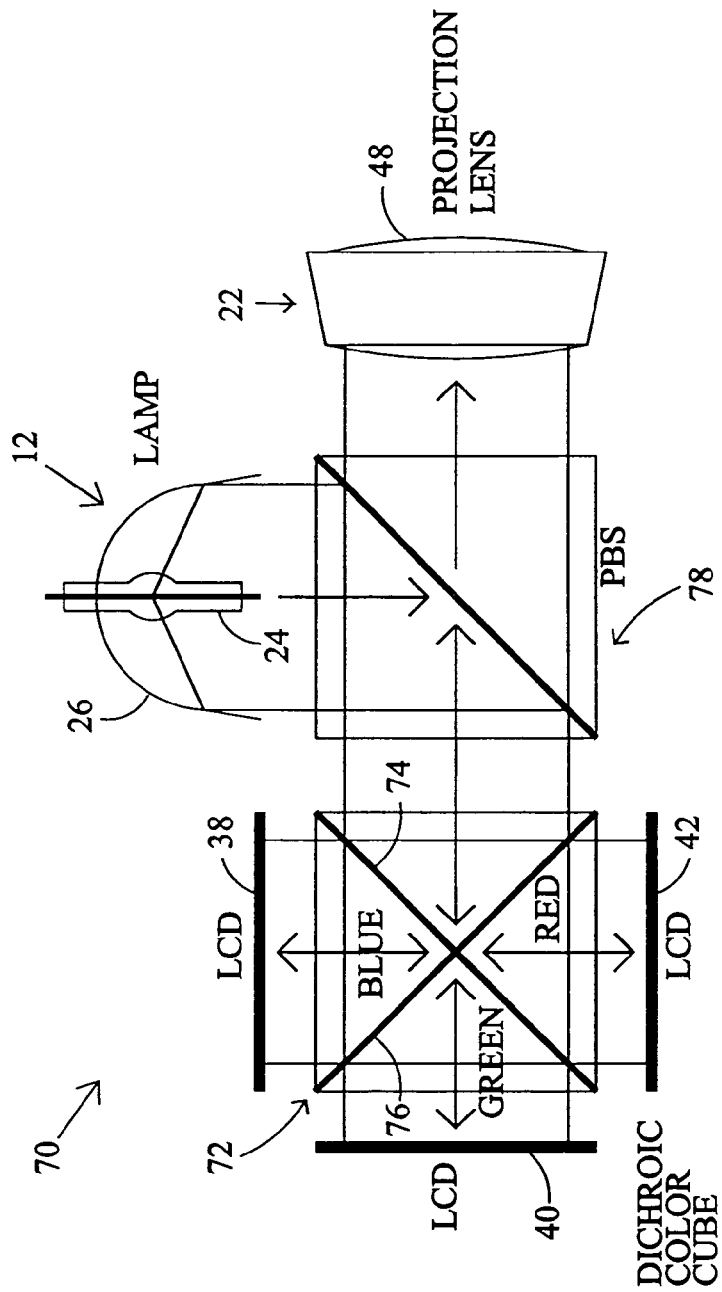

It may be seen in FIG. 4 that the light path from any LCD to projection lens 98 encounters one and only one PBS and one and only one dichroic filter. The optical path length has been reduced to a minimum of twice the active width of the LCD panel. Reflective LCD panels typically used in projection systems of the type described herein typically vary in size from approximately 7 mm to 5 cm, diagonal measurement. The optical path length is typically no less than approximately 1.6 cm to 14 cm. In this configuration, however, it is not necessary to cross any color filtering or polarizing structure in the optical path. There is, therefore, no obstruction of any kind in the projection path as in the configurations of FIG. 3. This represents a significant performance advantage. The configuration of FIG. 4 may also be implemented easily with thin plate dichroics and PBSs, which represents a significant cost advantage over a cube prism configuration.

Figure 5:
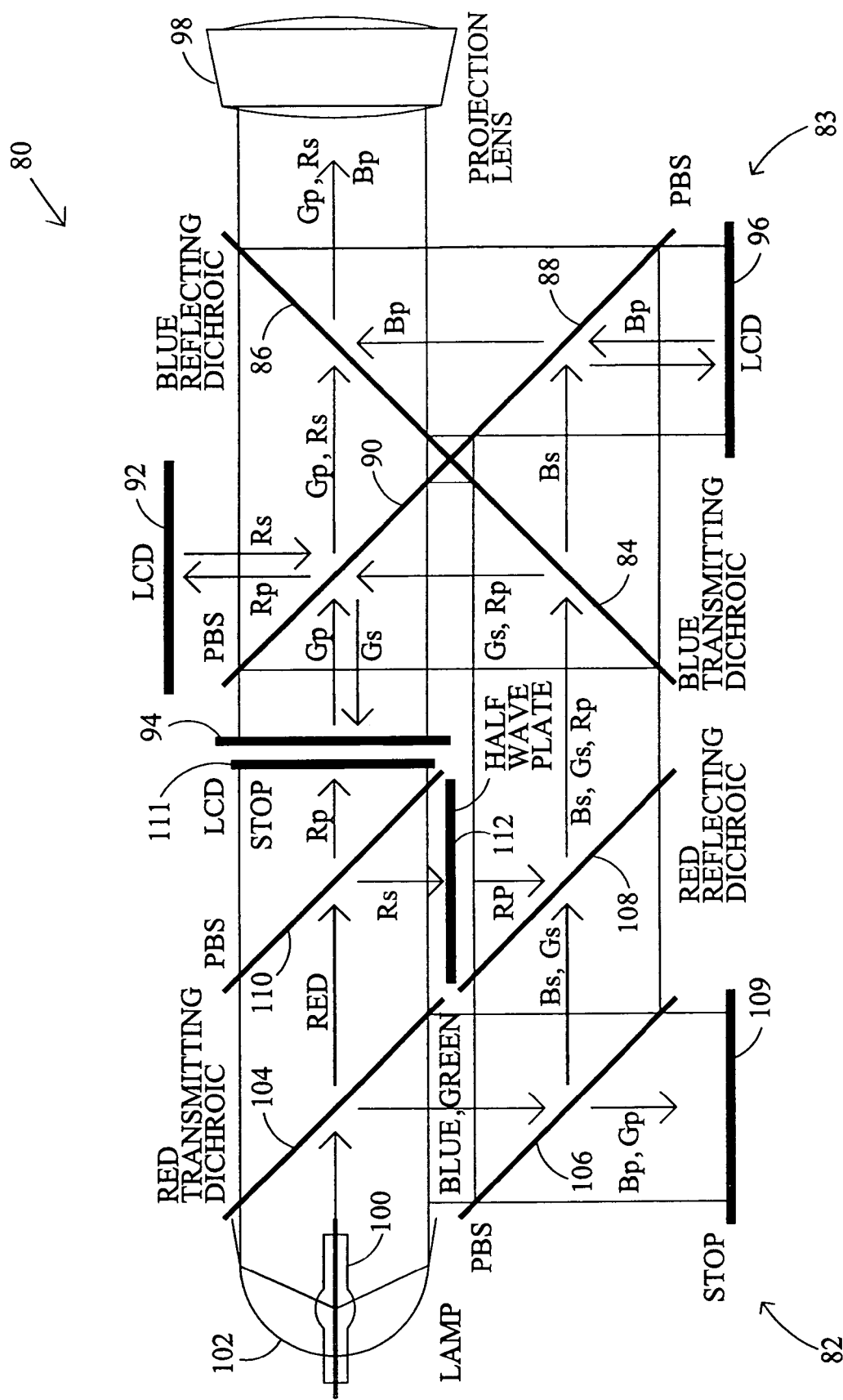
FIG. 5 is a schematic representation of a first embodiment of a light source and the projection system of the invention.

Projection display system 80, as shown in FIG. 5, includes projection system 83 of FIG. 4, and a specific embodiment of a pre-filtering illumination mechanism required to obtain the special combination of input light for the proper operation of this architecture. Light source 82 includes a lamp 100 and reflector 102, and a number of DFs and PBSs. An unpolarized white light beam from lamp 100 is incident on a red-transmitting dichroic filter 104. The blue and green light from the lamp reflect from filter 104 to a PBS 106. The s-polarized portions of the green and blue light then reflect off the PBS toward a red reflecting dichroic filter 108, while the p-polarized green and blue portions are absorbed by a stop 109. The two distributions that pass through dichroic filter 108 provide the s-polarized blue and green input to projection system 83. The unpolarized red light transmitted by dichroic filter 104 is polarized by PBS 110, and the s-polarized portion is reflected toward red-reflecting dichroic filter 108, while the p-polarized red portion is absorbed by stop 111. Before impinging the dichroic, the light passes through a half wave plate 112 that rotates its polarization direction by 90 degrees. The red light is now p-polarized, reflects off red-reflecting dichroic 108 and provides the p-polarized red light input to projection system 83.

Figure 1:
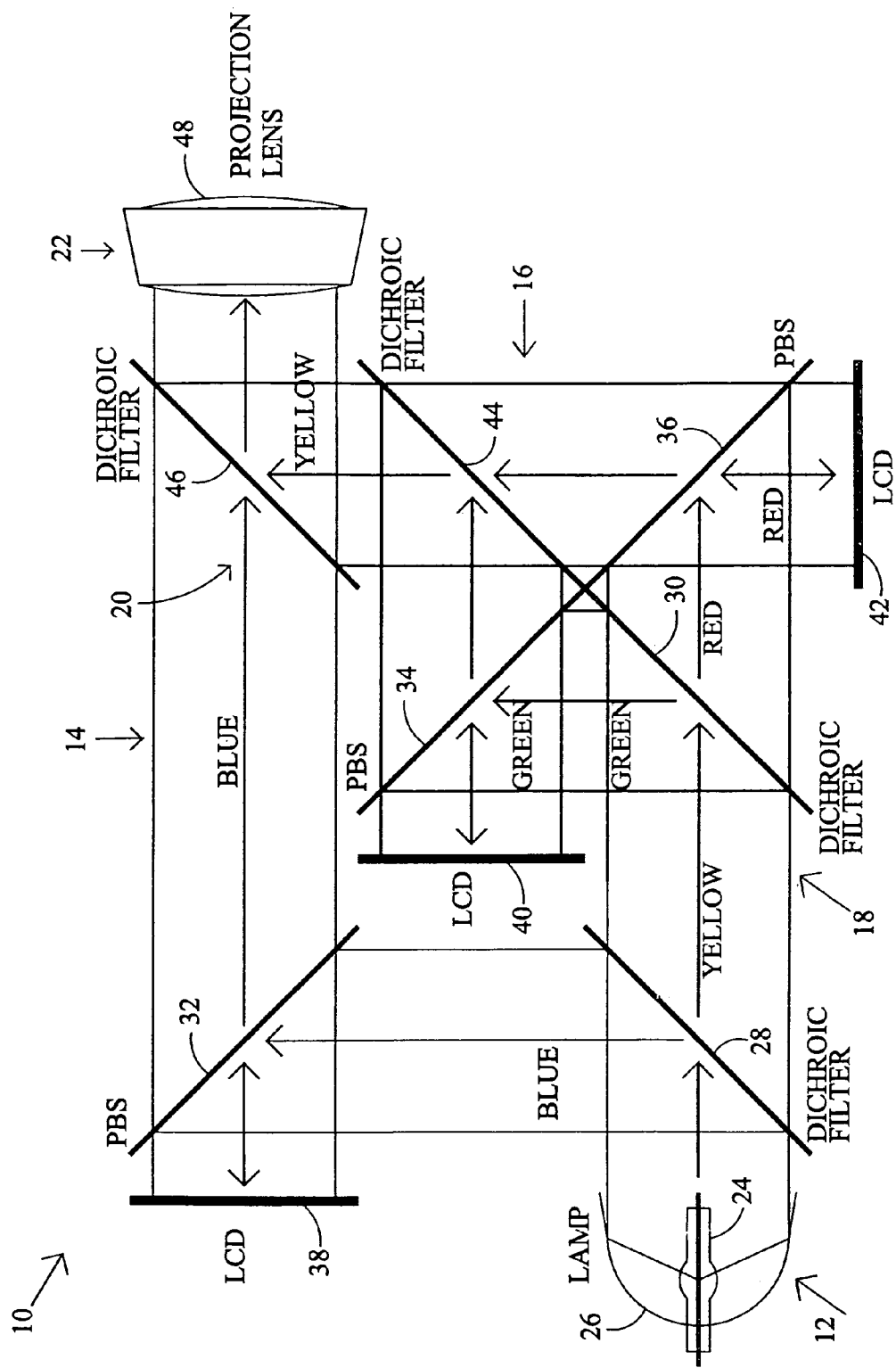
FIGS. 1–3B depict examples of prior art projection display systems.
Figure 2:
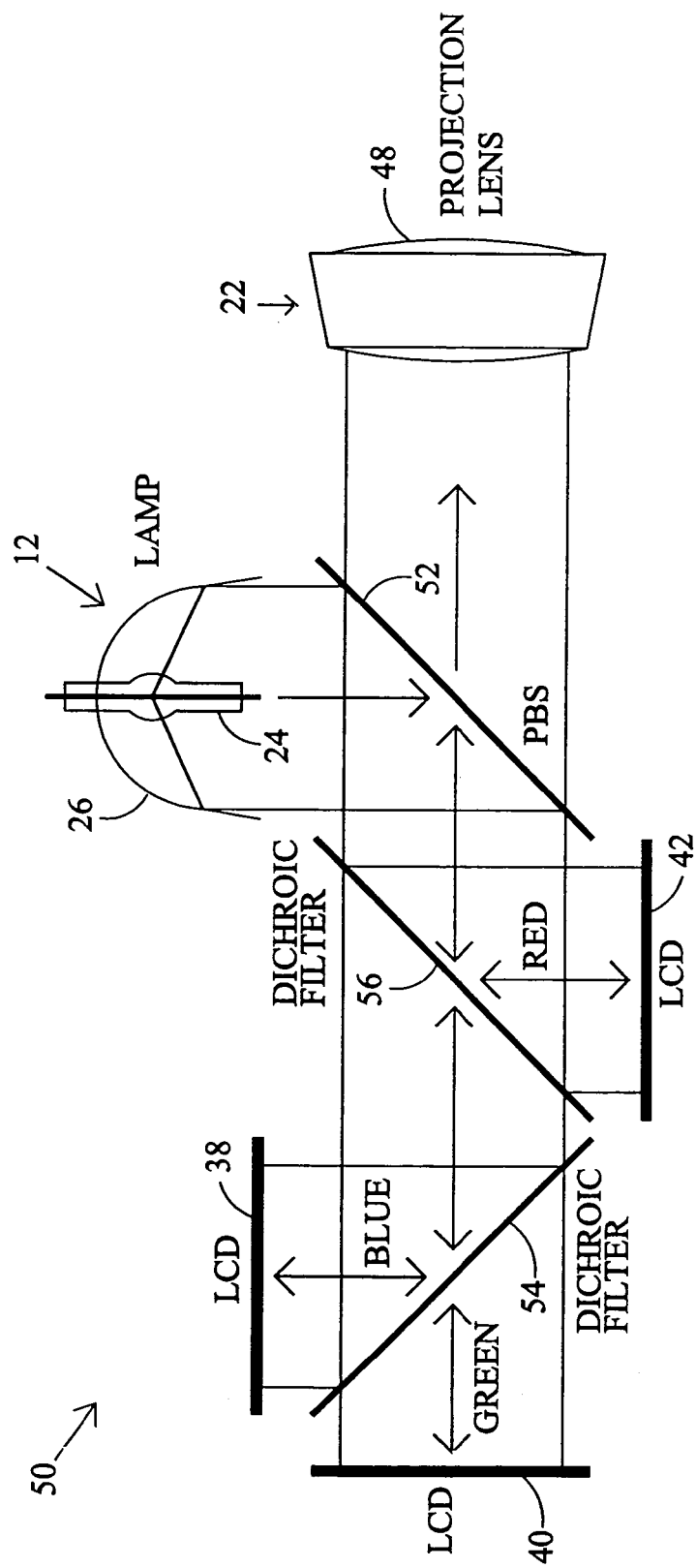

The pre-filtering configuration has the advantage of being implemented with fairly standard and inexpensive filtering components. One disadvantage of this arrangement is that the portions of the light distributions that pass through PBSs 106, 110 and hit stops 109, 111, respectively, are absorbed and lost. This light is half of the total light output from lamp 100. This level of light loss is typical of LCD projection systems that do not use polarization converters or recyclers. A second disadvantage is the additional size of the pre-filtering optics adding to the whole system. While the size of this complete system is smaller than the original reflective architecture described in FIG. 1, that uses simple plate filters and PBSs, it is quite a bit larger than the configurations of FIG. 2 or 3.

Figure 6:
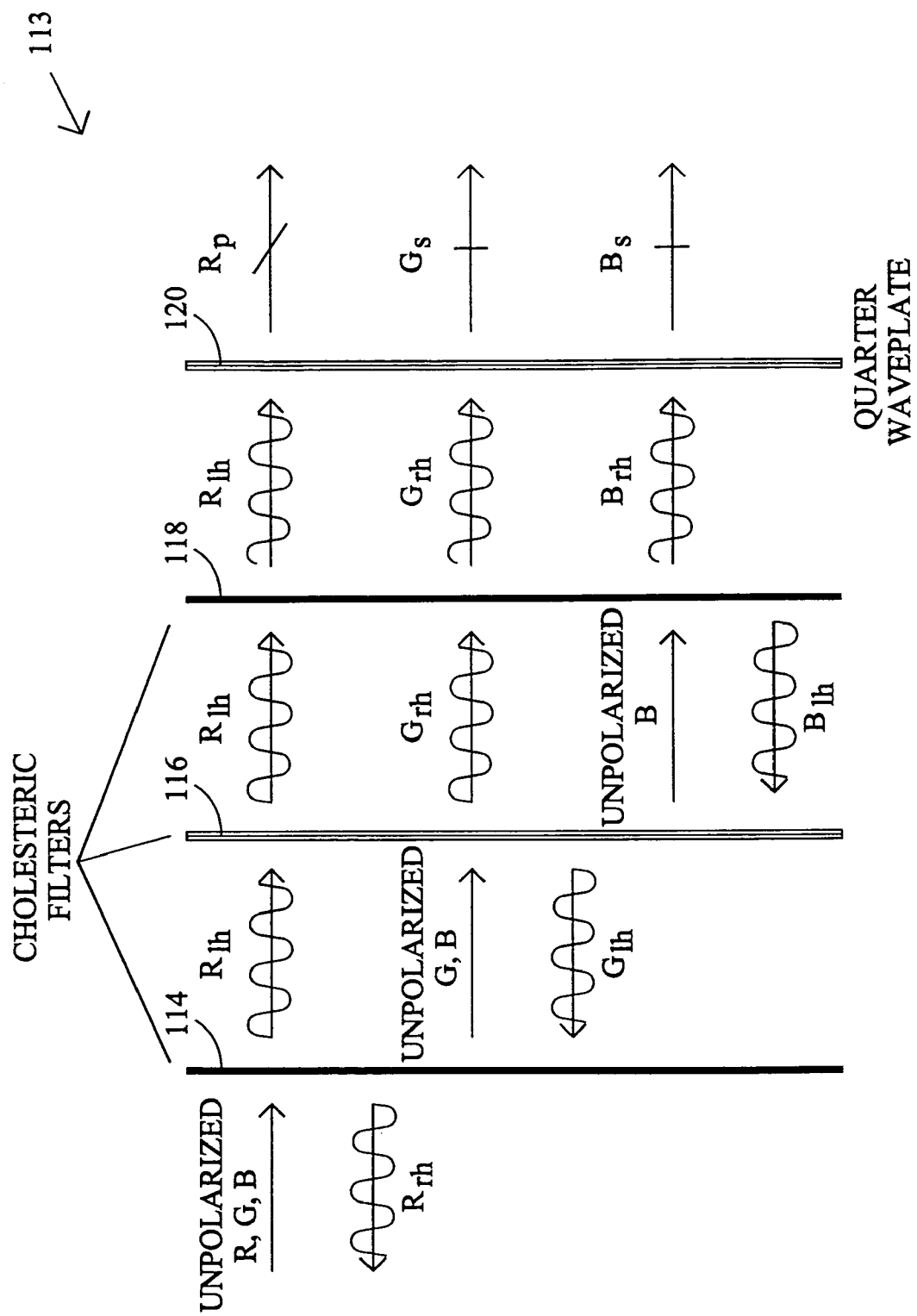
FIG. 6 is a schematic representation of a filter stack of the invention.
Figure 7:
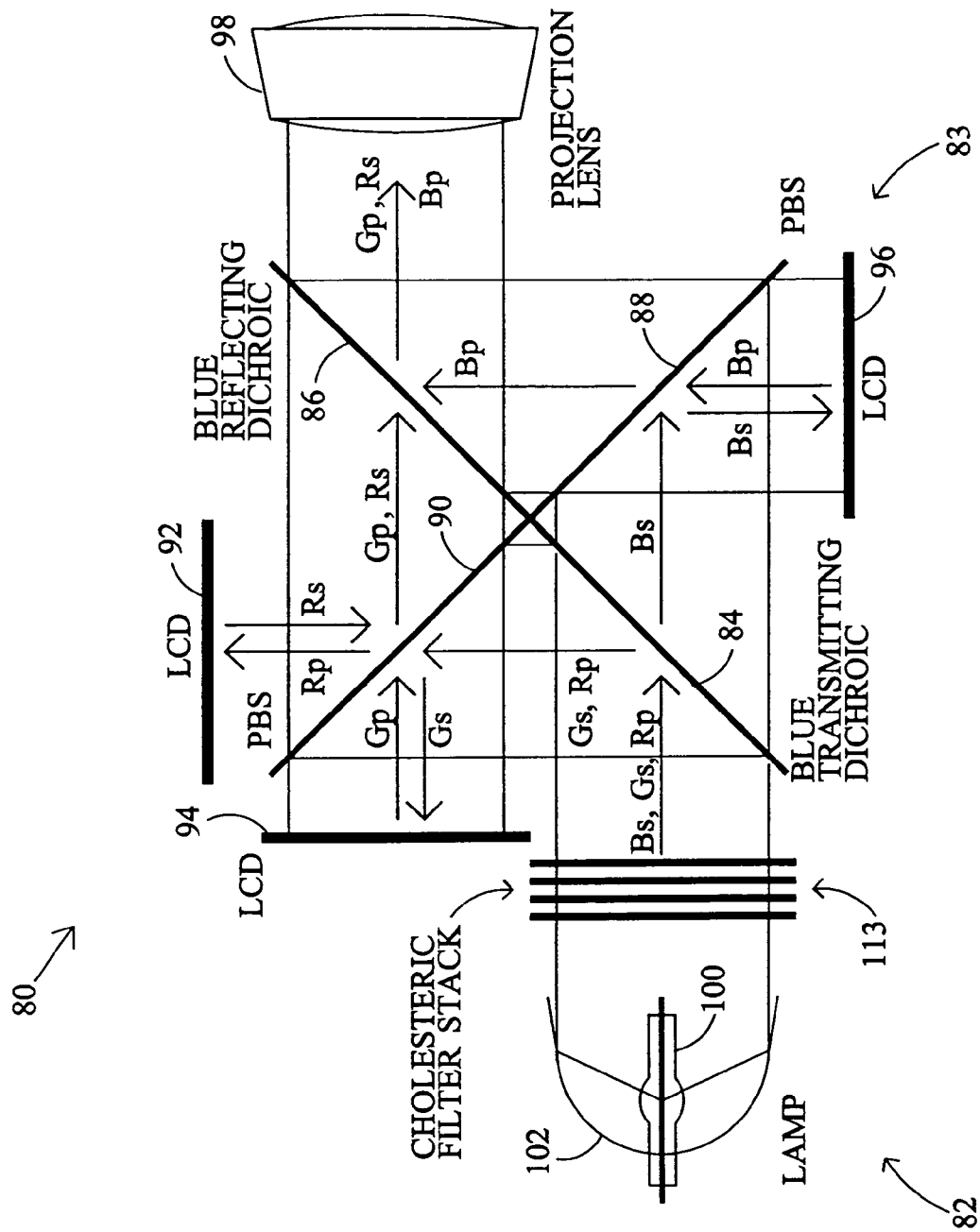
FIG. 7 is a schematic representation of a first embodiment of a projection display system of the invention.

A solution to the size problem may be found in another embodiment of the pre-filtering optics, as shown in FIGS. 6 and 7. Referring now to FIG. 6, an embodiment of a light source filter stack is shown generally at 113. Filter stack 113 uses specially designed cholesteric color filters 114, 116, 118. Cholesterics are chemical structures which have a spirally twisted molecular alignment. These materials have a special optical property that causes light of a wavelength that is equal to the pitch of the cholesteric spiral to be completely reflected if the light is circularly polarized, with the direction of circularity being the same as the direction of the cholesteric spiral. Thus, a cholesteric filter may be set up to reflect the left or right handed circular polarized portion of one color of light and to transmit the other handedness. The cholesteric does not affect any other color of light, transmitting both polarizations. The chemical structures of cholesterics may be manipulated to cause this special reflecting property to extend over a fairly broad range of wavelengths. The bands may be tuned to give just about any desired color passband for the portion of light that is reflected.

The pre-filtering operation of filter stack 113 is as follows: Unpolarized white light is incident on the stack from the left. First filter 114 is designed to reflect the right-handed circularly polarized portion of red light, and transmit the left-handed circularly polarized portion of the red light, and all polarizations of green and blue light. Second filter 116 is designed to reflect the left-handed polarization portion of green light. The right-handed polarization portion of green light is transmitted along with the left-handed polarized portion of the red light and the unpolarized blue light. Third filter 118 is designed to reflect the left-handed polarization portion of blue light, and transmits the right-handed polarization portion of blue and the rest of the incident light i.e., the right-handed polarization portion of green light and the left-handed polarization portion of red light.

Circular polarization may be turned into linear polarization by passing the light through a quarter wave plate 120. Right-handed polarized light will exit wave plate 120 as linearly polarized with the direction of polarization at +45 degrees to the crystalline optic axis of the wave plate material. Left-handed polarized light will also exit the wave plate linearly polarized, but the direction will be at −45 degrees to the crystalline axis. Thus, with proper orientation of the wave plate axis, the right-hand polarized green and blue light will exit as s-polarized and the left-hand polarized red light will exit as p-polarized. This is the desired input to the imaging portion of the projection architecture.

The system shown in FIG. 7 uses pre-filtering stack 113 as part of light source 82 directly after lamp 100 to implement complete projection display system 80. System 80 is significantly smaller than the arrangement made with more conventional components in FIG. 5. The smaller size is the main advantage of this embodiment. This configuration has the same light loss problem as that of FIG. 5 because the cholesterics reflect half of the unpolarized light in their passband. This is again typical in many LCD projectors. Another disadvantage is the relative immaturity of the cholesteric materials. It is not clear at this point if the filtering materials will be as efficient or as durable as the dielectric stack materials used in dichroic filters and in PBSs. The system of FIG. 7 is a preferred embodiment if those questions may be satisfactorily answered.

The embodiment of projection system 83 of system 80 is the preferred embodiment. There are, however, alternative methods of arranging the color and polarization distributions. As an example, if the first dichroic 84 in FIG. 4 is changed to red-transmitting and the second dichroic 86 is changed to red-reflecting, then the pre-filter must polarize green and red light with s-polarization and blue with p-polarization. In this case, the roles of LCD 92 and LCD 96 in modulating the red and blue light distributions are reversed, but in all other respects the system is equivalent. It is, however, undesirable to set this type of system up with the dichroics being green-reflecting and green-transmitting, which will have LCD 96 modulating the green light. Green dichroic filters have two band edges in the visible spectrum-one separating red and green and the other separating blue and green. The position of the band edges is highly dependent on the polarization of the light. If green dichroics are used, either red or blue light will have to be polarized in the opposite state from the green light and the filtering at the band edge between the two differing polarization states will be poorly controlled. In the system shown in FIG. 4, using blue dichroics, the band edges of both filters separate blue and green. Both of these light distributions have the same polarization when they are split apart by the first, bluetransmitting dichroic, and when they are recombined by the second, blue-reflecting dichroic. The filtering at the band edge in both filters may therefore be well controlled. The same is true if red dichroics are used.

Figure 8:
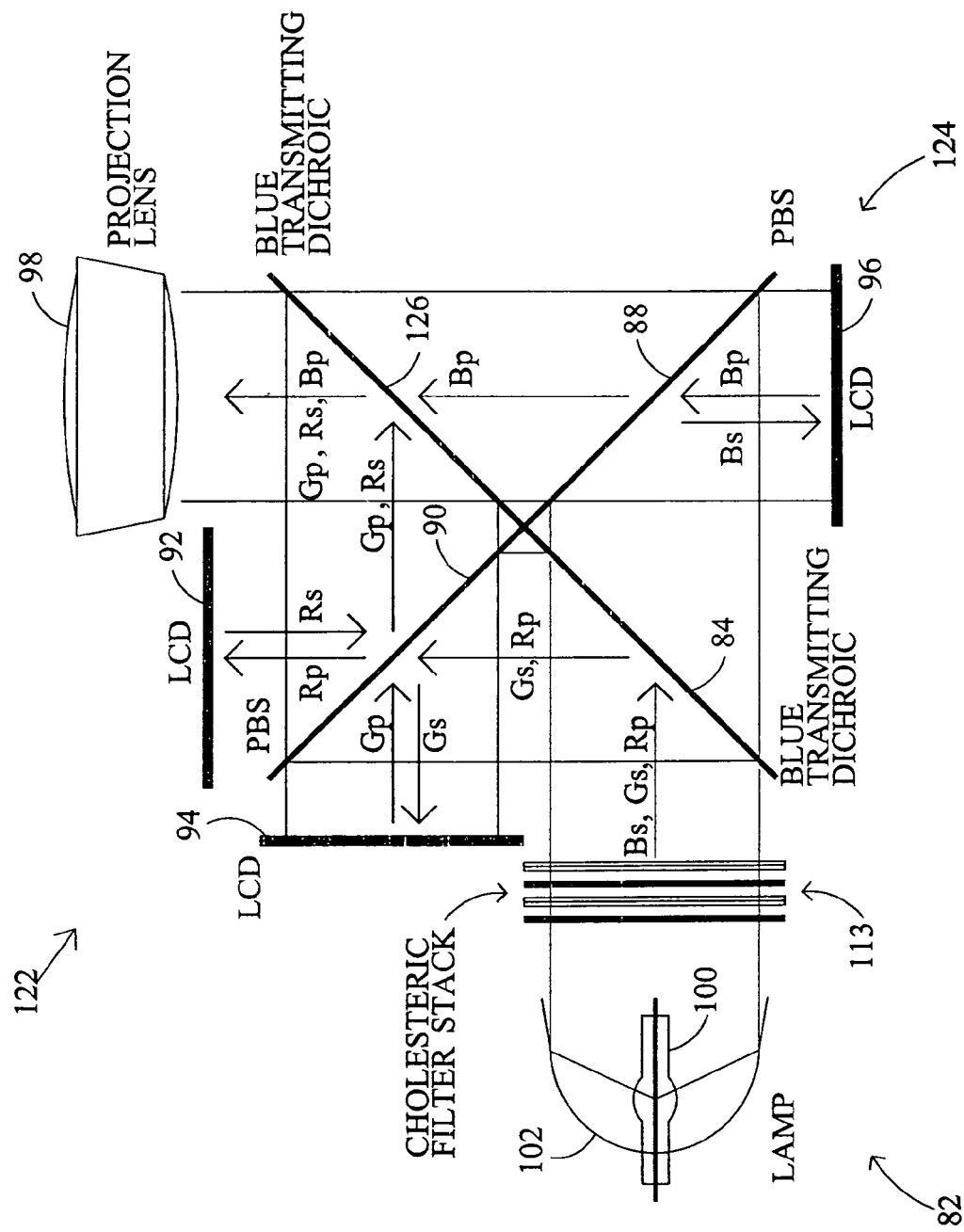
FIG. 8 is a schematic representation of a second embodiment of a projection display system of the invention.
Figure 9:
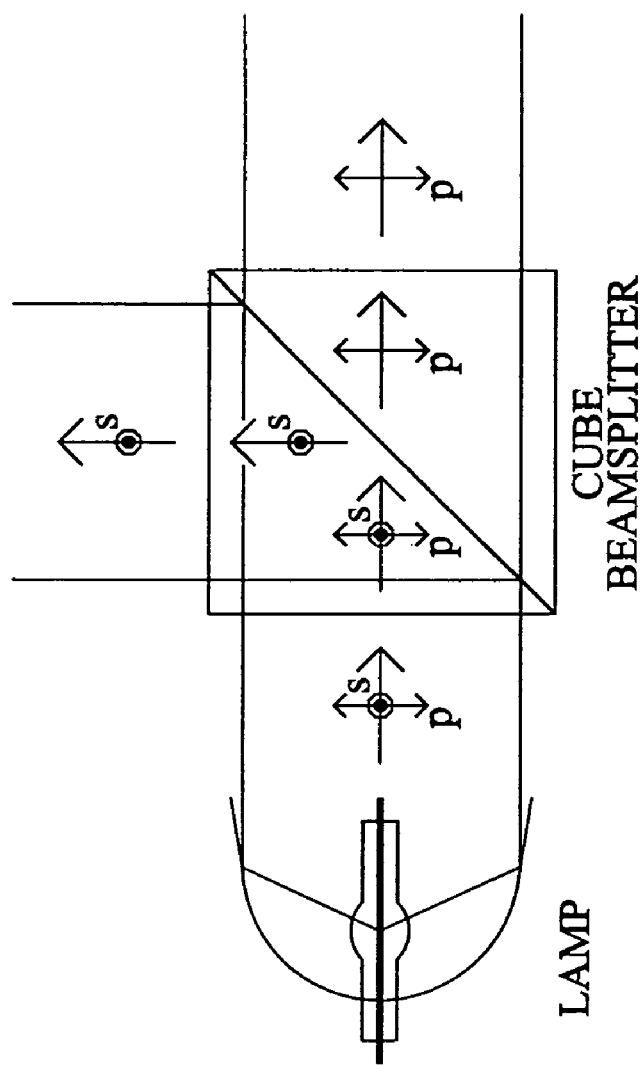
FIGS. 9–14B depict examples of prior art polarization converters.
Figure 10:
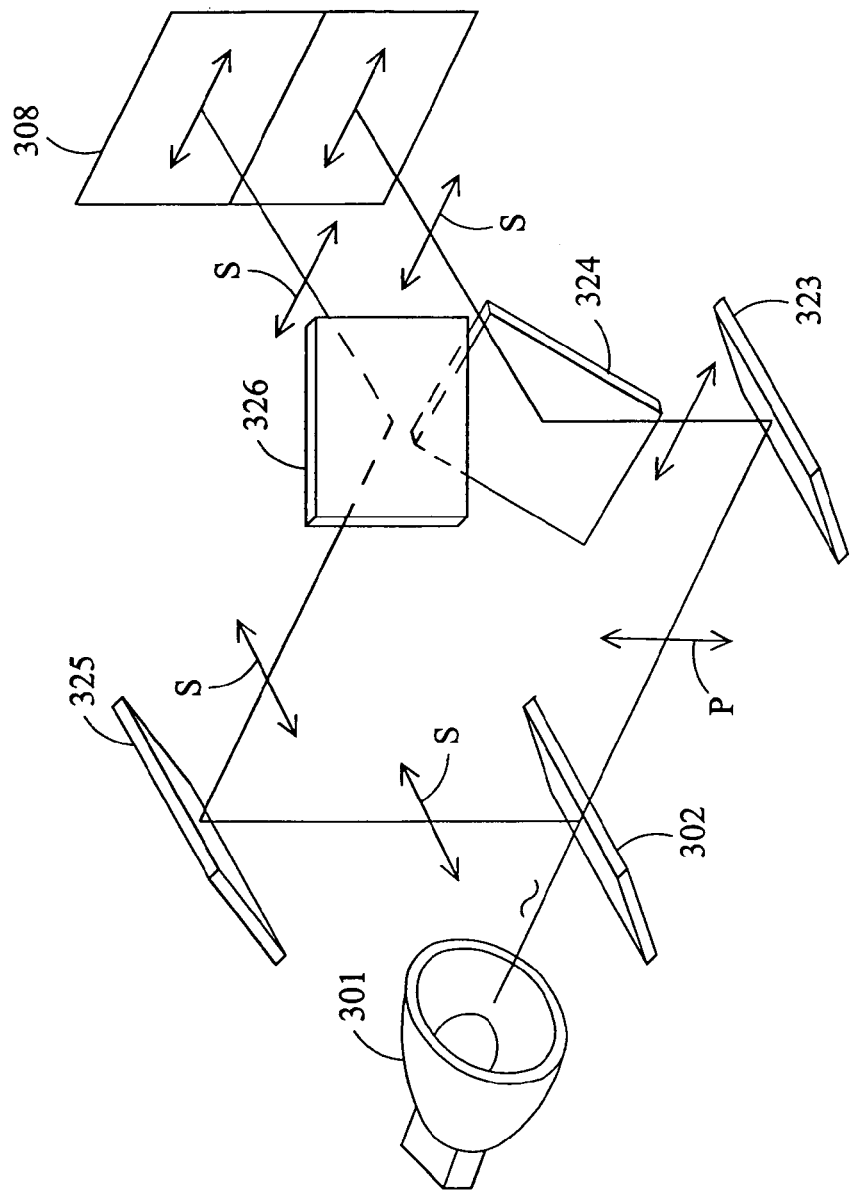
Figure 11:
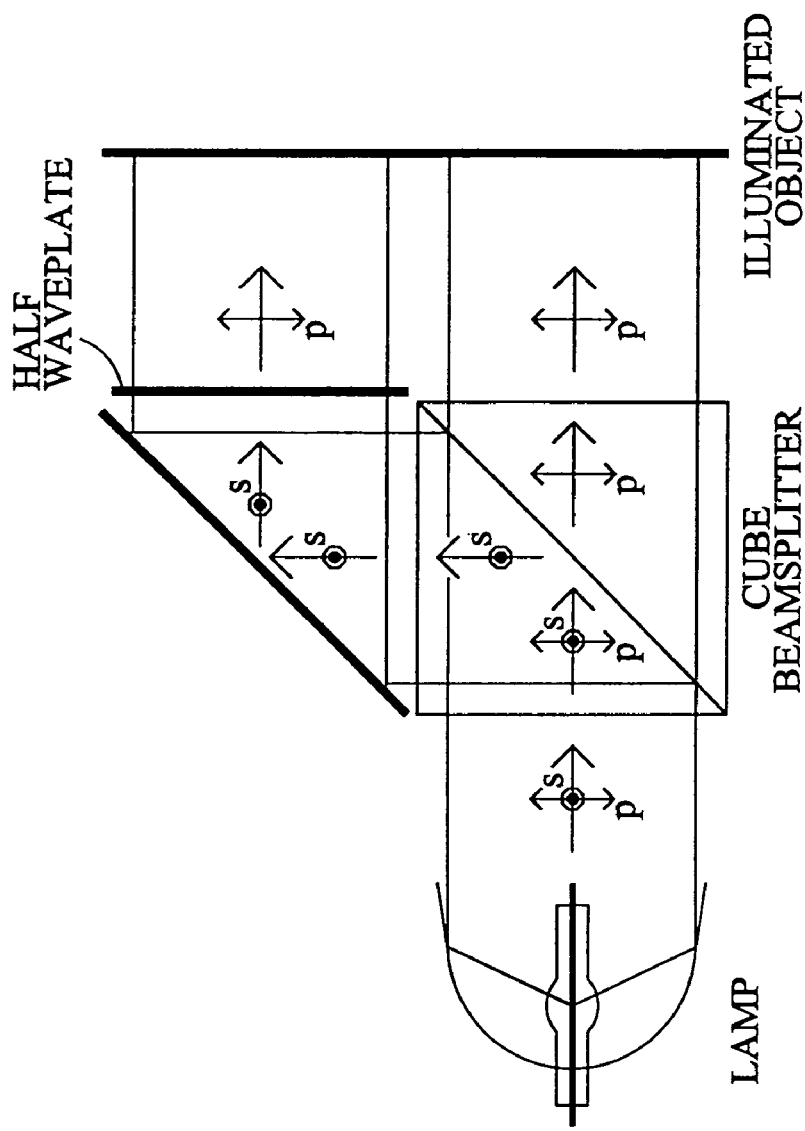
Figure 12:
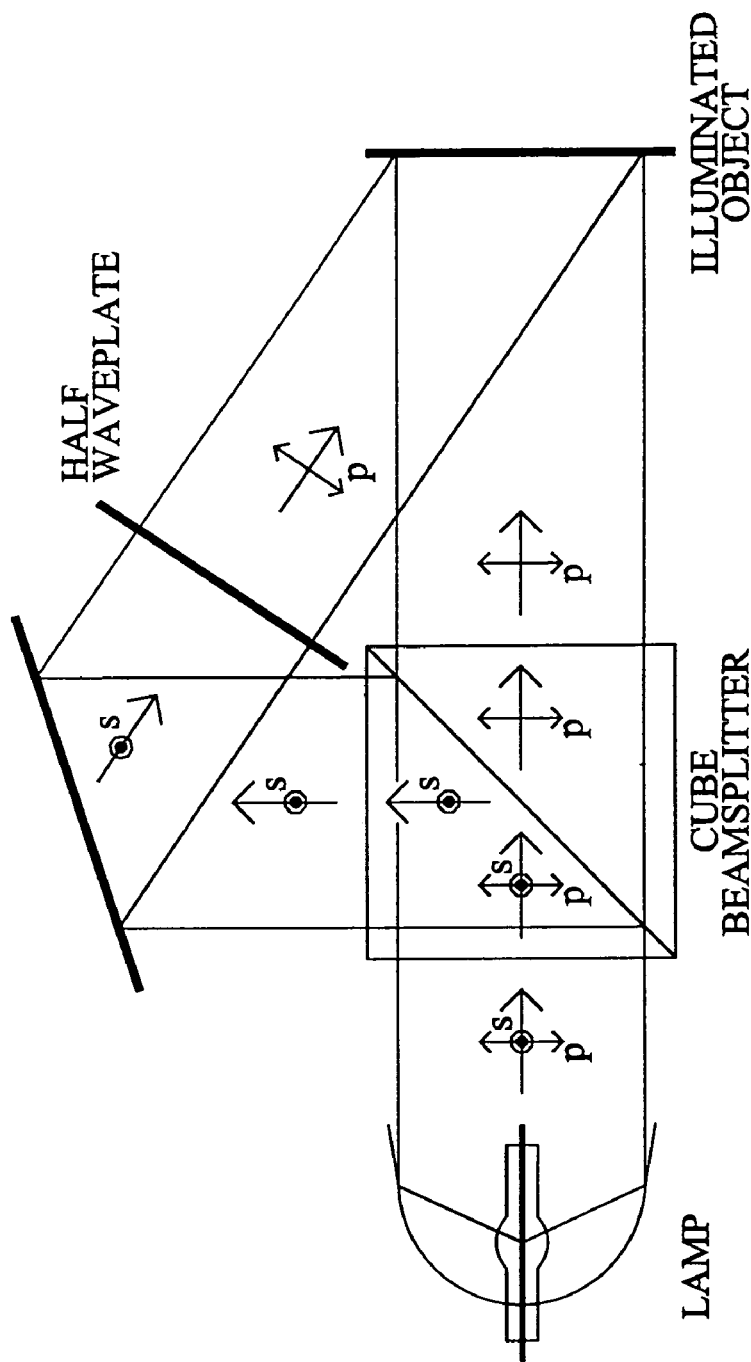
Figure 13:
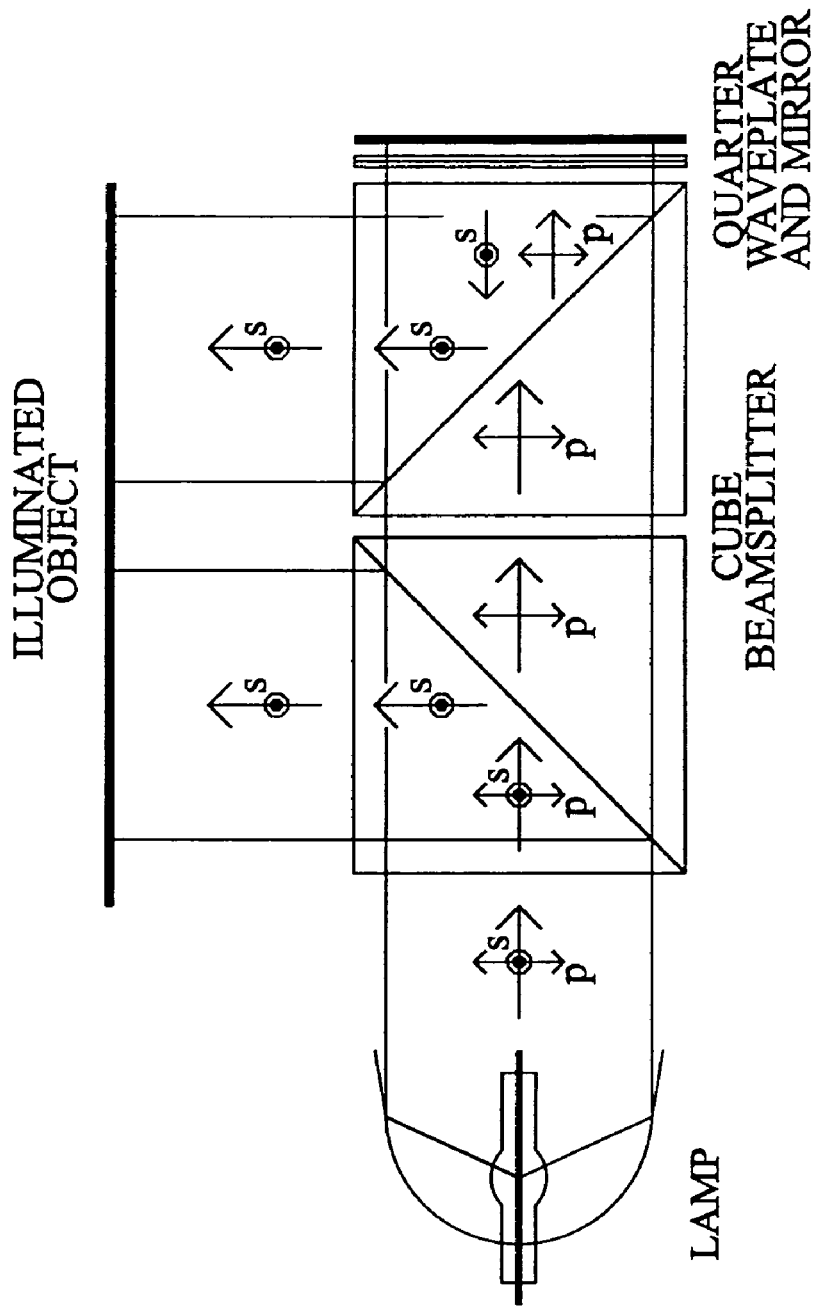

Projection display system 122, depicted in FIG. 8, includes a projection system 124 having, in addition to the components of projection system 83, a blue-transmitting dichroic filter 126, located prior to projection lens 98, which replaces blue-reflecting filter 86 shown in FIG. 7. The result is to direct the recombined light distributions out of projection system 124 at ninety degrees from that of projection system 83 of FIG. 7. This alternative embodiment may offer packaging advantages for some products. It should be noted that the band edge of first blue transmitting filter 84 in FIG. 8 is used to separate s-polarized blue and green light, while the second blue transmitting filter 126 is used to recombine p-polarized blue and green light. For reasons mentioned in the previous paragraph, these are not identical filters.

2. Spectrally Distributed Polarization Converter

The present invention further provides a method and apparatus for converting light into two separate light components, each of the light components having different polarizations. As used herein, a light component refers to different color or spectral bandwidths, such as red, blue or green light components. As discussed above in connection with the pre-filtering required for projection display systems utilizing polarization light, the throughput of the system may be enhanced by using a polarization converter. The projection system of the present invention requires the polarization of one of the light components to be polarized differently than the polarization of another light component, but the prior art polarization converters do not provide the required polarization. The different polarizations are preferably at 90-degree orientations but may be at any other suitable angle or relationship, as desired. Also, right- and left-hand circular polarizations may be used. It is also to be understood that any set of wavelength ranges may be used for the light components, as desired. Also, any number of light components may likewise be used, as desired. Accordingly, the present invention further provides a spectrally distributed polarization converter to provide pre-filtering for the requisite polarization for each light component.

Figure 15:
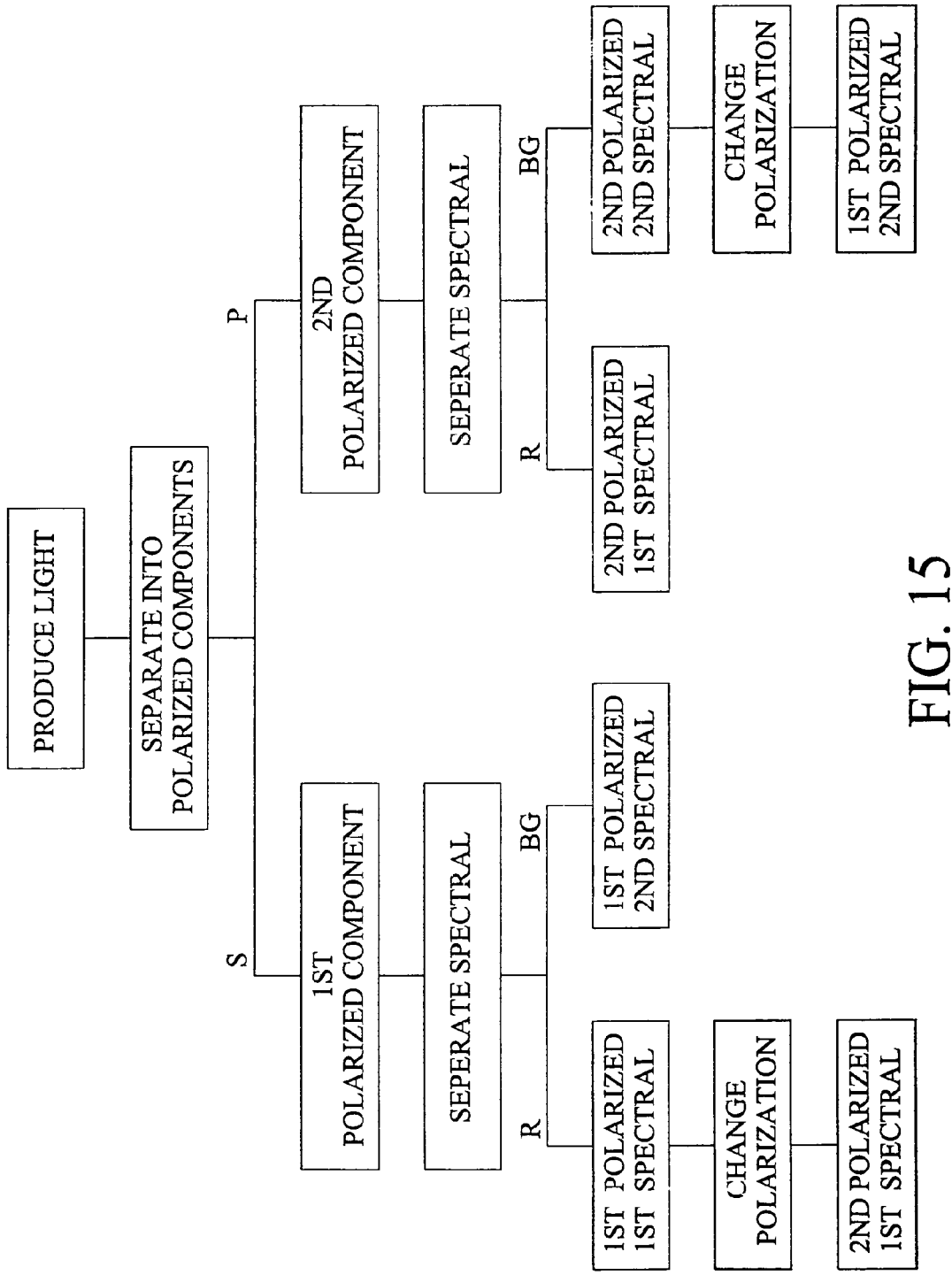
FIG. 15 shows a block diagram for a method of converting spectrally distributed polarized light according to the present invention.

Referring now to FIG. 15, the first step involves producing a light beam that is nonpolarized and has at least two light components. The next step involves separating the light into two light components having different polarizations, with substantially all of the light beam being transmitted.

The second step may be accomplished in a variety of ways. In one method, the light is first separated into a first polarized component having a first polarization and a second polarized component having a second polarization. Next, the first polarized component is spectrally separated into the first light component and the second light component. The polarization of the first light component is then changed to the opposing second polarization. Likewise, the second polarized component is spectrally separated into the first light component and the second light component. The polarization of the second light component is changed to the first polarization. As a result, all light of the first light component has the second polarization, and all of the light of the second light component has the first polarization.

Figure 16:
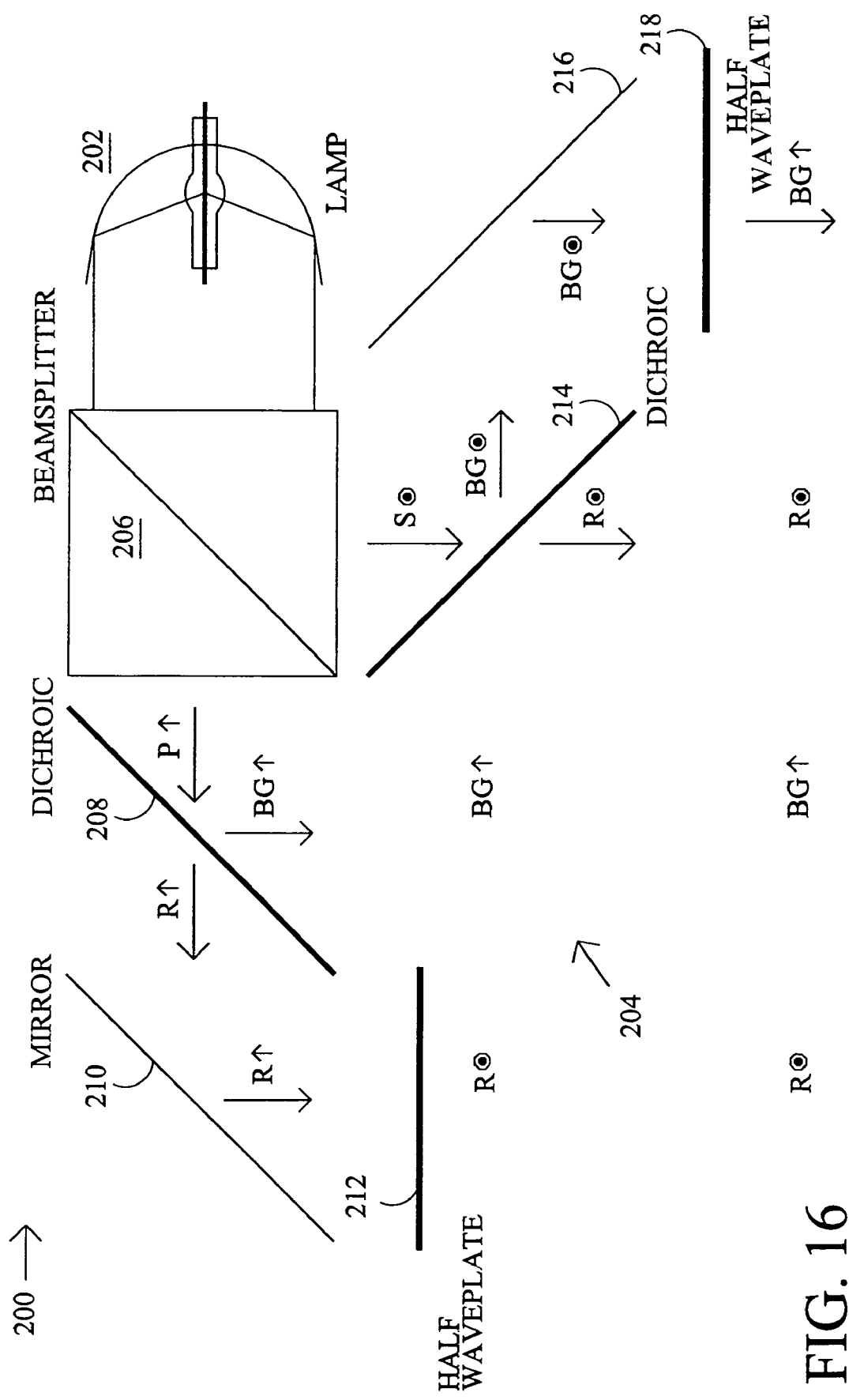
FIG. 16 is a schematic representation of an embodiment of a spectrally distributed polarization converter of the present invention.

Several optical systems may be employed to carry out the method illustrated in FIG. 15. FIG. 16, for example, illustrates one such simple optical system. The polarization converter 200 is used with a light source 202 that produces nonpolarized white light having red, green, and blue components. The converter 200 has an optics array 204 for separating the white light into at least two color components having different polarized states. The white light first encounters polarizing beam splitter 206, which reflects light polarized in the s-direction and transmits light polarized in the p-direction.

The transmitted p-polarized component then encounters a dichroic filter which reflects the blue and green components and transmits the red component. The red component continues to folding mirror 210, which is aligned at a forty-five degree angle. The red component then passes through half waveplate 212, which converts the red component from p-polarized to s-polarized.

Likewise, the s-polarized light reflected by beam splitter 214 is transmitted to a dichroic filter 214 which reflects the blue and green components and which transmits the red component. The blue and green components are reflected toward the folding mirror 216, which then transmits the blue and green components through another half waveplate 218. The half waveplate 218 changes the polarization of the blue and green components from s-polarized to p-polarized.

Each of the separated light components then exit the optics array 204 and are directed toward an illuminated object, which could be another optical system or lens. As can be seen, the optics array 204 transmits nearly all of the light produced by the light source 202, except for transmission losses occurring as a result of passing through or reflecting from the optics themselves. Thus, substantially all of the light produced by the light source 202 is transmitted through the optics array 204. As can be seen, the optics array in FIG. 16 results in a four fold increase of the étendue of the light source 202.

Figure 17:
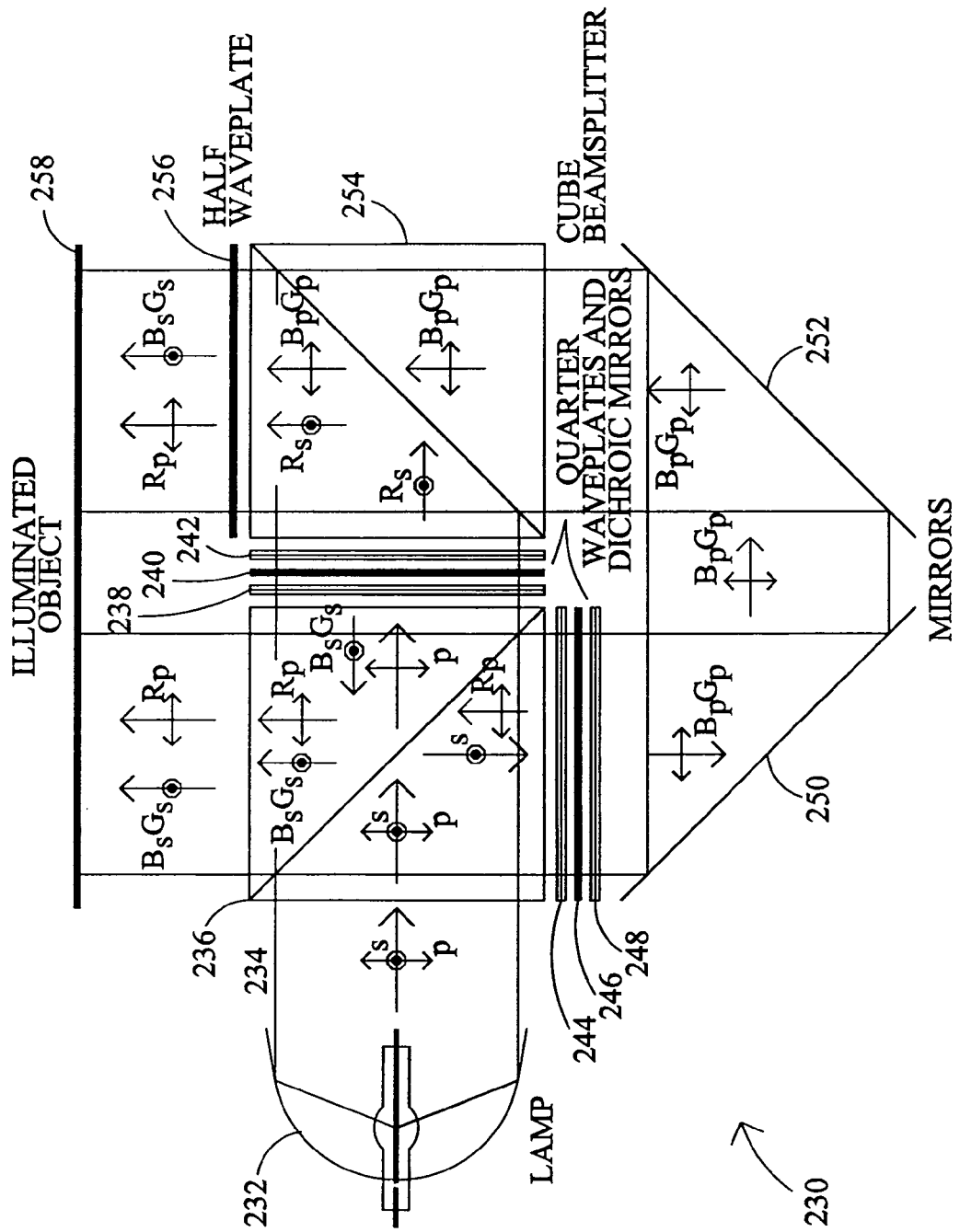
FIG. 17 is a schematic representation of another embodiment of a spectrally distributed polarization converter of the present invention.

FIG. 17 illustrates a more efficient spectrally distributed polarization converter 230. The light from the light source 232 enters optics array 234 and is divided into its s- and p-polarizations by a polarizing beam splitter 236. The p-polarized white light passing through the splitting surface exits beam splitter 236 and passes through a quarter waveplate 238, turning it into circularly polarized light. This distribution then hits a dichroic filter 240 that reflects the blue and green components, but transmits the red component. The reflected blue and green components pass back through the first quarter waveplate 238 and are converted back into linear polarization, but now aligned in the s-direction, having been rotated by 90 degrees due to passing twice through the quarter waveplate 238. The blue and green components return to the splitting surface of beam splitter 236 where they are reflected, exiting the beam splitter 236 and falling on the illuminated object 258. The red component that was transmitted by the dichroic filter 240 passes through another quarter waveplate 242 whose optical axis is aligned with the first waveplate 238. The red component passing through quarter waveplate 242 is also converted into s-polarization. The s-polarized red component enters a second beam splitter 254 where it is reflected at the splitting surface and exits the beam splitter 254. It then passes through a half waveplate 256 where its polarization is rotated by 90 degrees to be p-polarized and it also falls on the illuminated object.

In contrast, the s-polarized light from the light source 232 reflects from the splitting surface of the beam splitter 236. The s-polarized light exits the beam splitter, passes through a quarter waveplate 244, which circularly polarizes the light. The light then hits a second dichroic filter 246, which reflects the red component and transmits the blue and green components. The reflected red component passes back through the quarter waveplate 244 converting the red component into p-polarized light. This red component returns to the splitting surface of the beam splitter 236 and combines with the s-polarized green and blue components reflected from stack of the quarter waveplate 238 and dichroic filter 240. The p-polarized red component exits the beam splitter 236 and illuminates the same portion of the illuminated object 258 as the s-polarized blue and green components.

The blue and green components that are transmitted by the dichroic filter 246 pass through another quarter waveplate 248, which also has its optical axis aligned with quarter waveplate 244, thus converting the blue and green components into p-polarization. The blue and green components then reflect off of two mirrors 250 and 252 that redirect the blue and green components into the beam splitter 254. Thus, dichroic filter 246 is optically interposed between beam splitters 236 and 254. Since these blue and green components are p-polarized they pass through the splitting surface of the beam splitter 254 where they combine with the s-polarized red component transmitted by the dichroic filter 240. The blue and green components exiting from beam splitter 254 pass through a half waveplate 256, which converts them into s-polarized light, and illuminate the same portion of the illuminated object 258 as the p-polarized red components.

The configuration shown in FIG. 17 converts all of the red light from the light source 232 into s-polarization. It is clear from the figure that, similar to the conventional polarization converters, the étendue is doubled by this conversion process. Tilting various components in this configuration can bring the two illumination distributions together. This will result in the area of the illuminated region being the same as the original lamp output. This will also increase the angular distribution of the illumination, again doubling the étendue.

Figure 14A:
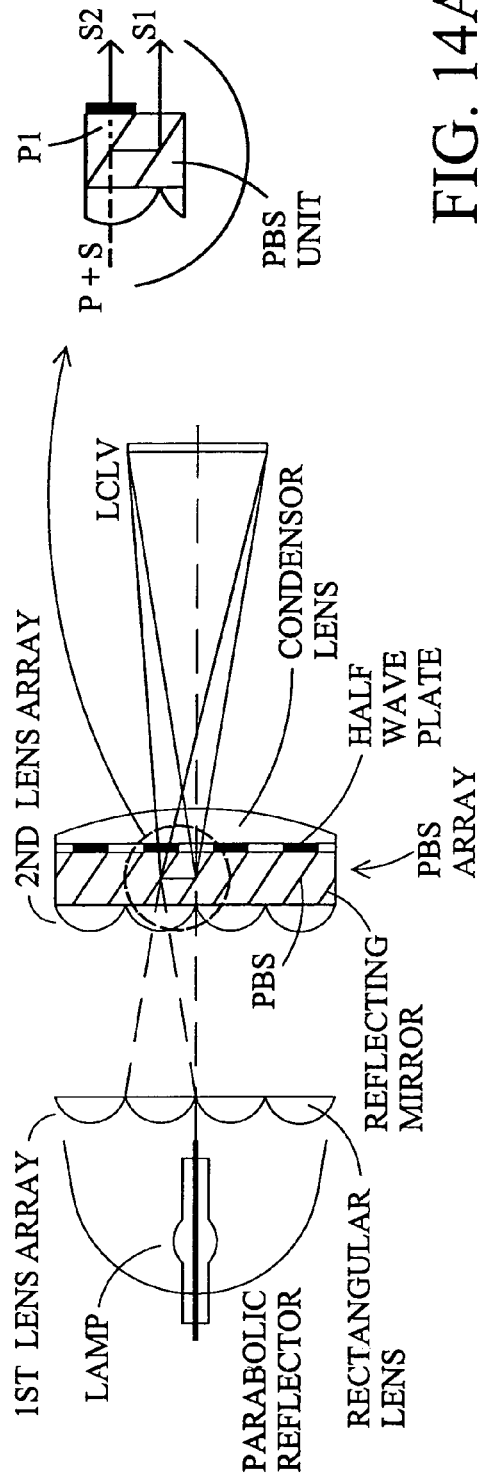
Figure 14B:
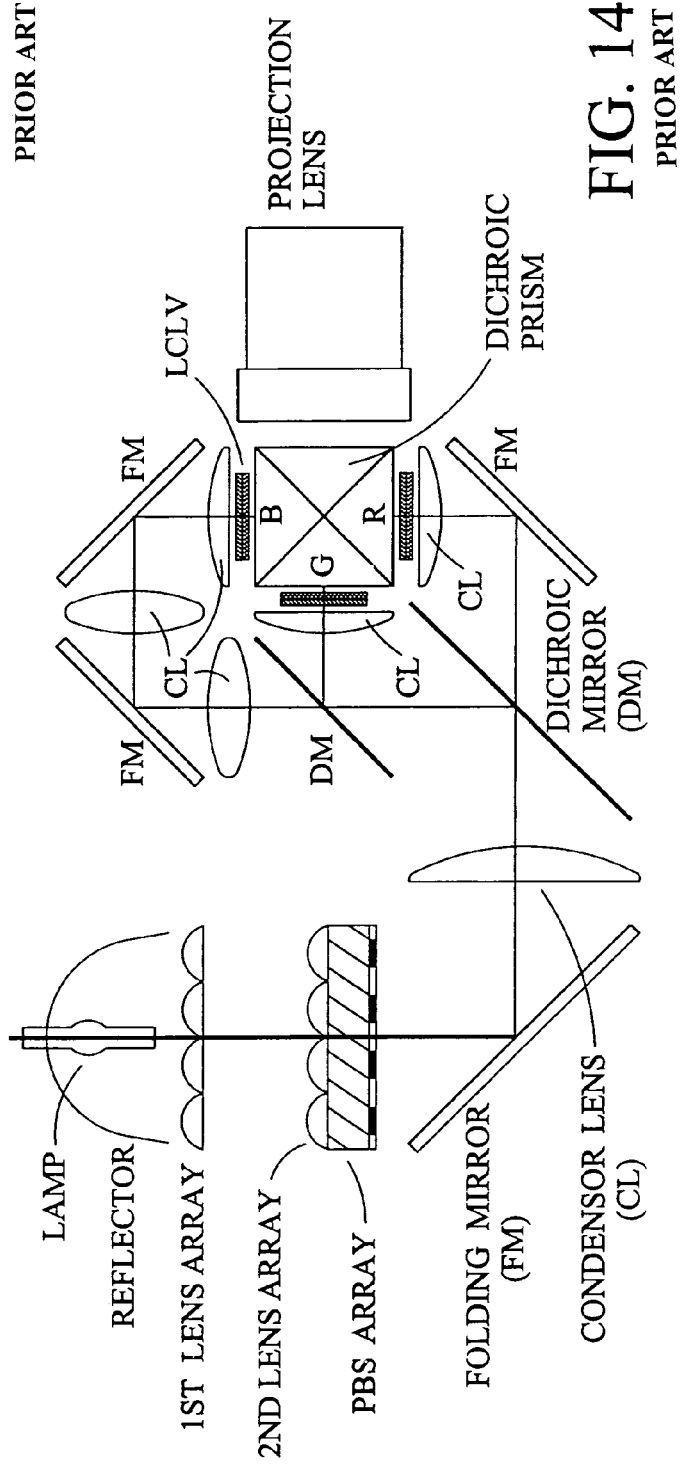
Figures 18A, 18B:
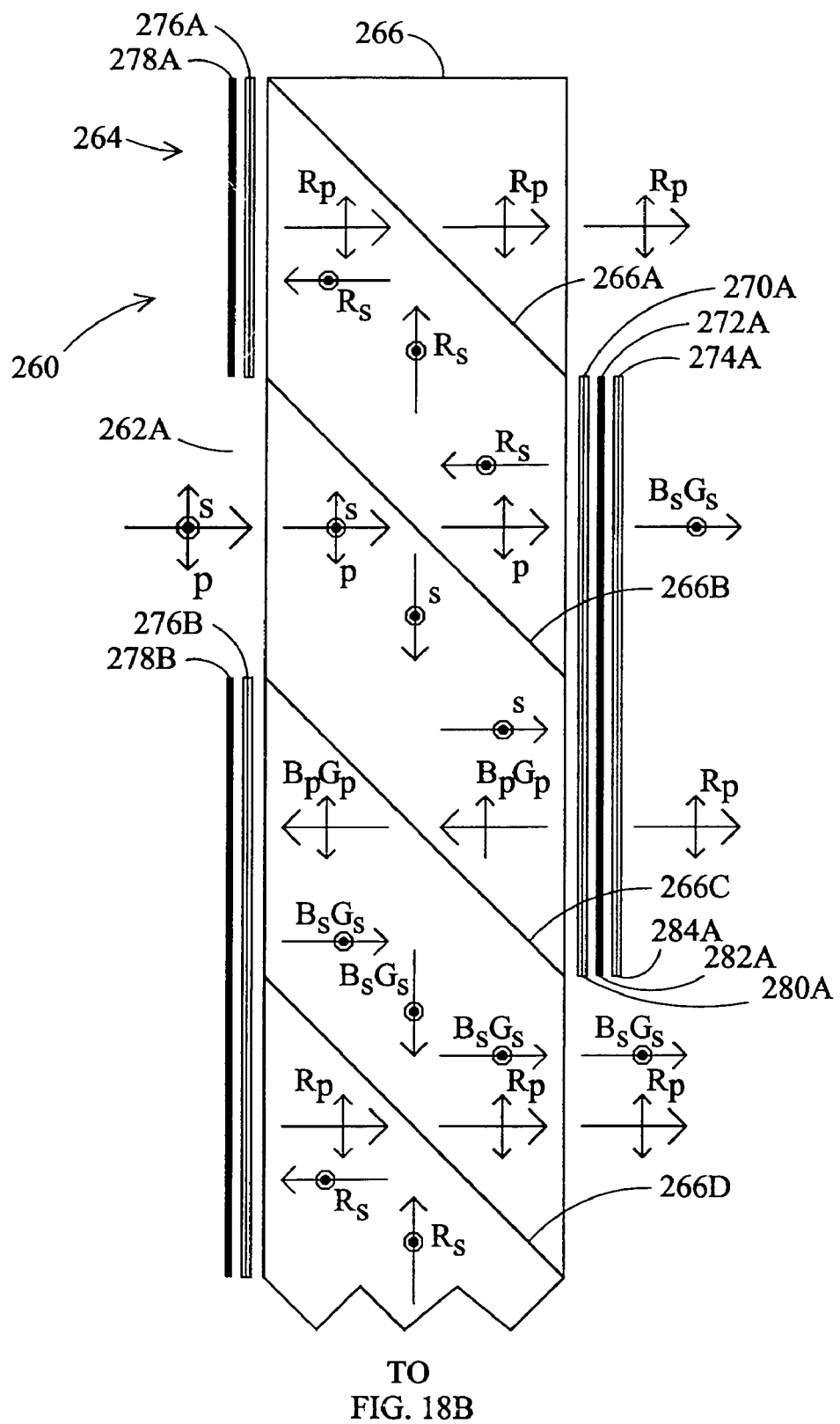
FIG. 18 is a schematic representation of another embodiment of a spectrally distributed polarization converter of the present invention.
Figure 18B:
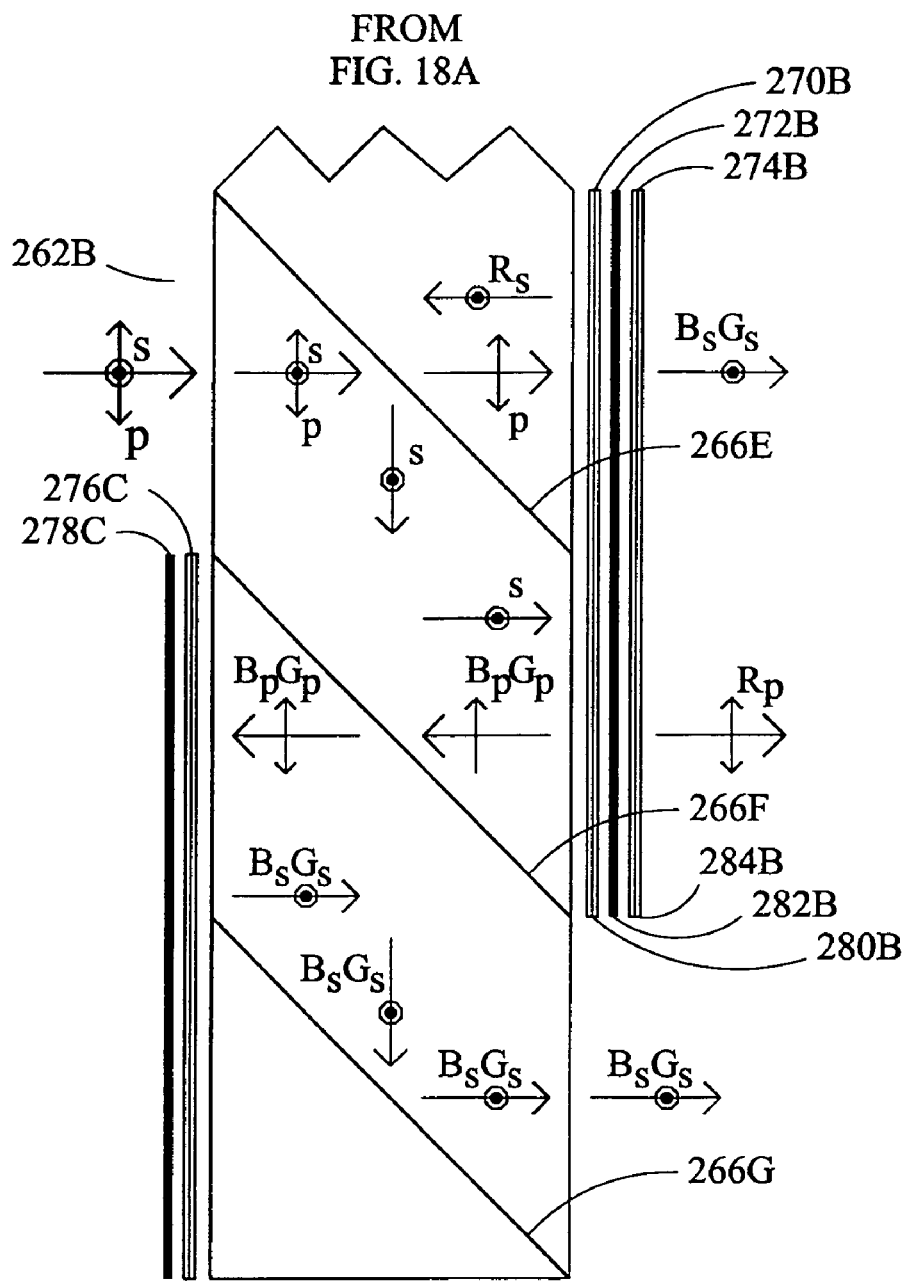

An alternative embodiment of this concept that is suitable to implementation in projectors with fly's-eye illumination optics is shown in FIG. 18. In this configuration, converter 260 has an optics array 264 comprised of a stack 266 of polarizing beam splitters 266*a*–*g* similar to the conventional converter shown in FIG. 14. In FIG. 18, light entering the beam splitter stack 266 through input 262*a* is divided into its two white light polarization states. The p-polarization passing through the splitting surface of PBS 266*b* enters another stack of aligned quarter waveplates 270*a*, 274*a* and a red reflecting dichroic filter 272*a*. The blue and green components that are transmitted by the dichroic filter 272*a* exit as s-polarized distributions due to the operation of the two quarter waveplates 270*a* and 274*a*. The red component reflected by the dichroic filter 272*a* is also converted into s-polarization. This red component returns to the splitting surface of PBS 266*b* where it is reflected up to another splitting of surface PBS 266*a* in the next beam splitting section. The red component again reflects from the splitting surface of PBS 266*a* and propagates to the left in the figure. The red component then passes through a quarter waveplate 276*a*, reflects from a metal mirror 278*a*, passes back through the quarter waveplate 276*a* and re-enters the beam splitter 266*a*. The action of the quarter waveplate 276*a* rotates the polarization direction so that it is now p-polarized. This red component now passes through the splitting surface of PBS 266*a* and out the beam splitter as the desired p-polarized red component.

The s-polarized white light that reflects from the splitting surface of PBS 266*b* reflects again from the next lower splitting surface of PBS 266*c* and then passes into another aligned quarter waveplate/dichroic filter stack consisting of quarter waveplates 280*a* and 284*a* and dichroic filter 282*a*. The dichroic filter 282*a* in this stack transmits red light and reflects green and blue and the quarter waveplates 280*a* and 284*a* convert all three of these components into p-polarization. The red component that is transmitted by the dichroic filter 282*a* is the rest of the desired p-polarized red light. The blue and green components that are reflected from the second dichroic filter 282*a* are converted back to s-polarization by first passing through the beam splitting surface of PBS 266*c* and then passing through the quarter waveplate 276*b*, reflecting off the metal mirror 278*b*, and passing through the quarter waveplate 276b. After passing through the waveplate 276b it now s-polarized green and blue components reflect off of two more polarizing splitting surfaces of PBS 266c and 266d and exit as the remainder of the desired s-polarized green and blue components.

Similarly, the converter 260 has quarter waveplates 270b and 274b, dichroic filter 272b, quarter waveplate 276c, metal mirror 278c, and quarter waveplates 280b and 284b, and dichroic filters 282b which operate in the same fashion as described above for like elements having the same reference numerals. As can be seen, the various optics may be repeated to provide for additional light inputs such as 262a and 262b.

In this embodiment, for the single input, there are four polarizing sections and the output is four separate components. The étendue of this output is four times greater than that of the input. However, the configuration shown in FIG. 18 has two inputs 262a and 262b for unpolarized white light. The operation of the beam splitters, waveplates, dichroic filters and metal mirrors is identical on this second input 262b as on the first input 262a described above. In the combination it can be seen that there is an overlap of the operations in one of the beam splitters, namely PBS 266d. The s-polarized green and blue components from the first input 262a combine with the p-polarized red component from the second input 262b. If all of the light from a light source is gathered and sent into these two inputs, then the resulting change in étendue is a 7 to 2 increase rather than a 4 to 1 increase. If three light inputs are used the increase is 10 to 3, and so on, with the general result for the N inputs being an increase of 3N+1 to N. Thus, for a large number of segments the étendue is a factor of three. The typical number of light inputs in a fly's-eye lens illuminator would be six or eight, so the increase in étendue would be approximately 3.2 for either case. Although this is larger than the twofold increase of the conventional polarization converter, it is still useful for larger LCD panels and for use with very small arc sources.

FIGS. 17 and 18 are the preferred embodiments. The first would be most useful in a system where no fly's-eye lens illumination was being employed and the second would be the preferred configuration for fly's-eye illuminators. The alternatives for this invention involve different specifications on the passband characteristics of the dichroic filters. The examples used to illustrate the process of producing s-polarized green and blue component and p-polarized red component are useful for one configuration of a reflective LCD projection system. Another configuration of this type of projector might require the green and red components to be s-polarized and the blue component to be p-polarized. The distribution of colors and polarizations is controlled by the dichroic passbands and must be matched to the requirements of the optical system being illuminated.

In addition, while the polarization converter of the present invention may be used to separate light into red, blue and green components, other color components could be chosen as well by simply selecting the appropriate optics. For example, the spectrally distributed polarization converter could be configured to separate the light into infrared, untraviolet, and visible components with selected polarizations. In addition, the polarization converter may be used to produce other final polarization states. The final polarization, for example, could be left and right handed circular polarization instead of s-polarization and p-polarization.

An alternative method for spectrally distributing the light and converting the polarization of the components may be accomplished by separating the light spectrally before separating the light by polarized components. The first step involves producing white light that is typically randomly polarized and has at least two spectral components. The light is separated spectrally into a first component and a second component. The first component is then separated into a first polarized component having a first polarization and a second polarized component having a second polarization. The polarity of the second polarized component is changed to the first polarization. Similarly, the second component is separated into a third polarized component having a first polarization and a fourth polarized component having a second polarization. The polarization of the third polarized component is changed to the second polarization. This results in the first component having the first polarization, and the second component having the second polarization.

Figure 19:
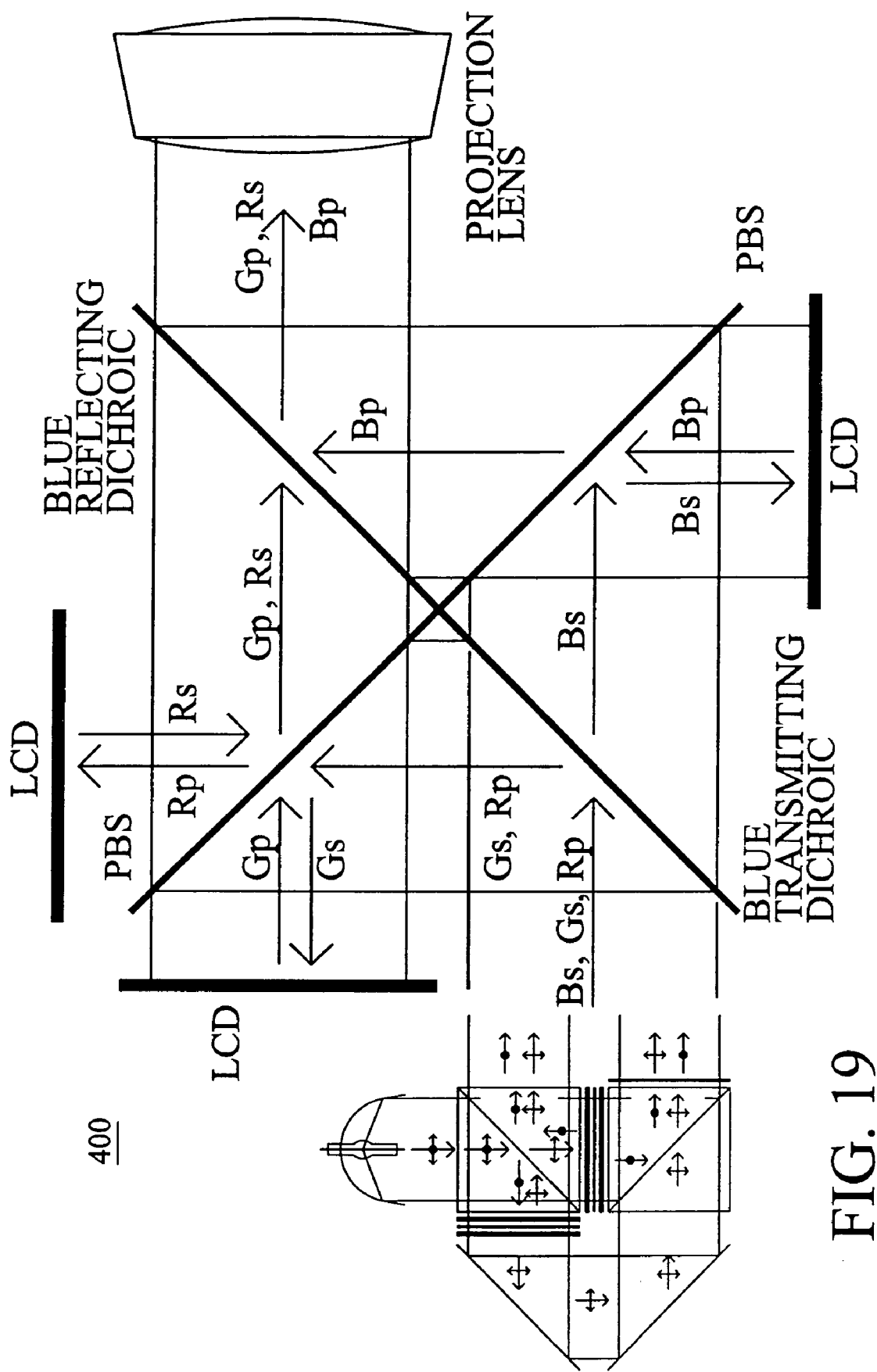
FIG. 19 is a schematic representation of another embodiment of a projection display system of the present invention.
Figure 20:
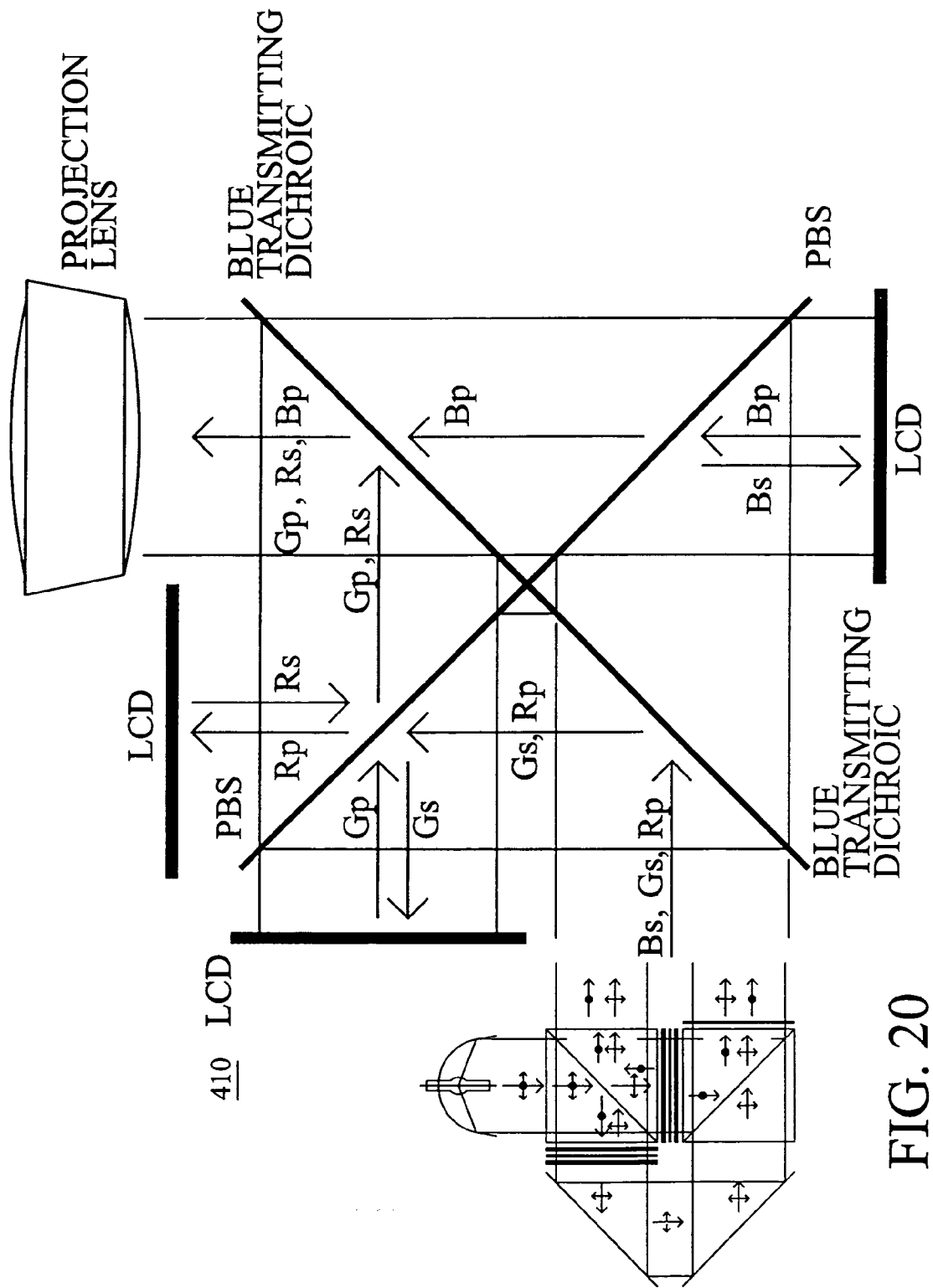
FIG. 20 is a schematic representation of another embodiment of a projection display system of the present invention.

3. Projection Display System Having a Spectrally Distributed Polarization Converter The spectrally distributed polarization converters of the present invention may be combined with the projection display systems of the present invention. FIG. 19 illustrates a projection display system 400 which is identical to FIG. 7, except that the pre-filtering stack 113 has been replaced with the spectrally distributed polarization converter 230 shown in FIG. 17. Likewise, FIG. 20 illustrates a projection display system 410 which is identical to FIG. 8, except that the pre-filtering stack 113 has been replaced with a spectrally distributed polarization converter 230. In each of these projection display systems 400 and 410, substantially all of the light from the lamp 100 is transmitted through the spectrally distributed polarization converter 230 into the projection systems 83 and 124, respectively, resulting in a brighter projected image. Additional optics may be desired between the polarization converter 230 and the projection systems 83 or 124 to provide alignment, collimating, or other optical adjustments.

Figure 21:
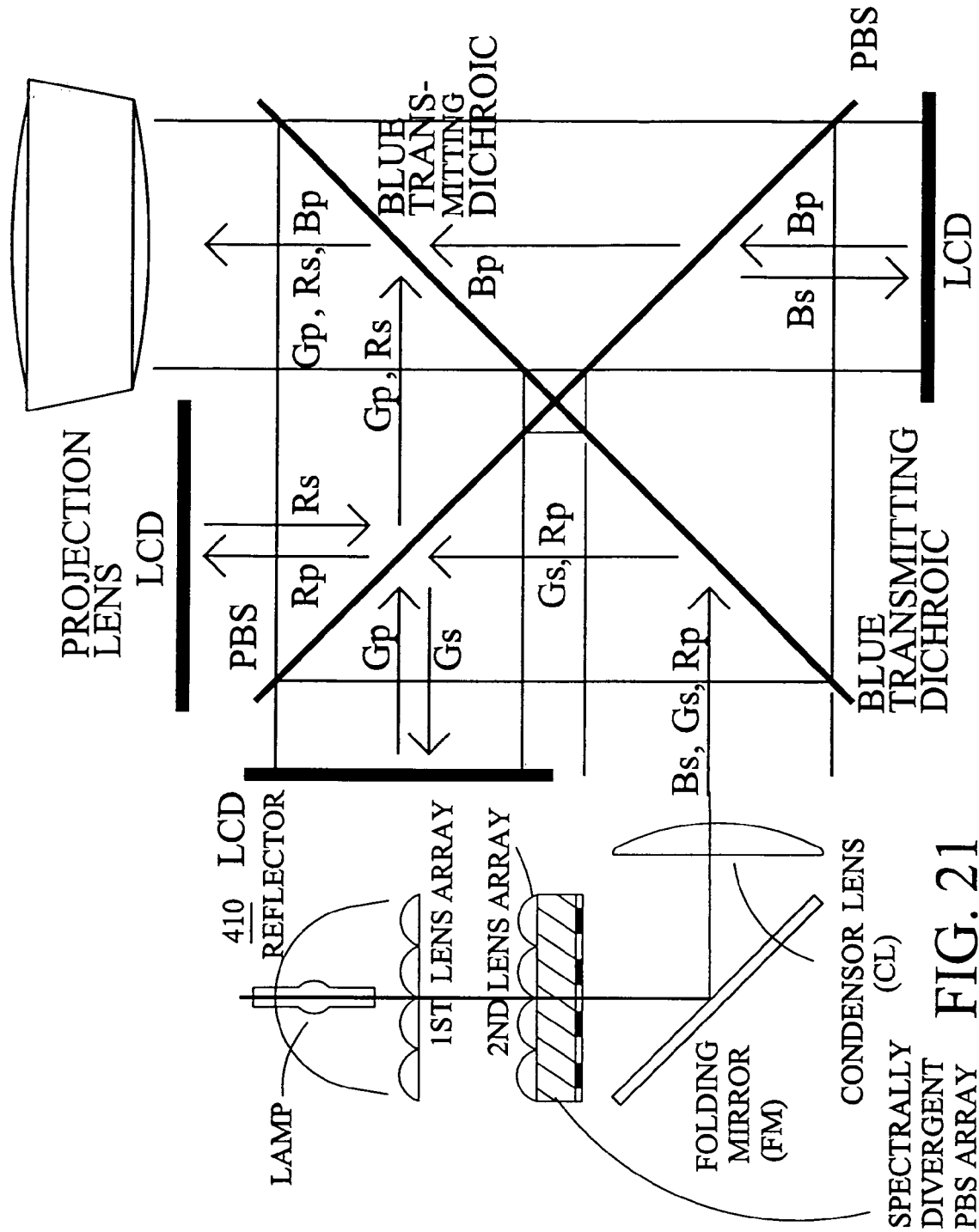
FIG. 21 is a schematic representation of yet another embodiment of a projection display system of the present invention.

FIG. 21 illustrates a projection display system that includes the spectrally divergent PBS array shown in FIGS. 18A and 18B together with the system of FIG. 8 with the cholesteric filter stack being removed.

Thus, a projection display system for reflective light valves, and several variations thereof have been disclosed. Although a preferred embodiment of the invention, and several variations thereof, have been disclosed, it will be appreciated that further variations and modifications thereof may be made without departing from the scope of the invention as defined in the appended claims. It will also be understood that depending on the particular embodiment developed, one or more of the aforementioned advantages may be achieved. In addition, transmissive light values (modulators) may also be used in combination with light having different polarities, if desired.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A projection display system using polarized light comprising:
    (a) a light source for generating a light beam having a least two light components, wherein said light components are polarized and at least one of said light components is polarized differently than another of said light components and said one of said light components has a color that is different than said another of said light components;
(b) a projection system having plural polarizing beam splitters and dichroic filters therein, wherein each polarizing beam splitter and dichroic filter reflects at least one of said light components and transmits at least another of said light components and a plurality of LCD panels, and LCD panel generating a light-component-specific image associated with one of said light components; and
(c) a projection lens for projecting an image combined from the light-component-specific images from the LCD's;
(d) wherein said light source includes a lamp and a filter stack having a cholesteric color filter mechanism located between said lamp and said projection system for pre-filtering said light beam to transmit red p-polarized light, green s-polarized light and blue s-polarized light.

2. A projection display system using polarized light comprising:
(a) a light source for generating a light beam having a least two light components, wherein said light components are polarized and at least one of said light components is polarized differently than another of said light components and said one of said light components has a color that is different than said another of said light components;
(b) a projection system having plural polarizing beam splitters and dichroic filters therein, wherein each polarizing beam splitter and dichroic filter reflects at least one of said light components and transmits at least another of said light components and a plurality of LCD panels, and LCD panel generating a light-component-specific image associated with one of said light components; and
(c) a projection lens for projecting an image combined from the light-component-specific images from the LCD's:
(d) wherein said light source includes a polarization converter for pre-filtering said light beam;
(e) wherein said light source includes a lamp for generating said light beam and a pre-filtering illumination mechanism located between said lamp and said projection system for pre-filtering said light beam to provide a red p-polarized light component to said projection system, wherein said pre-filtering illuminating mechanism includes a red-transmitting dichroic filter, a pair of polarizing beam splitters, a pair of light absorbing stops, a half-wave plate, and a red-reflecting dichroic filter; wherein said light beam impinges said red-transmitting dichroic filter, wherein said light beam is split into a reflected red light component and transmitted green light and blue light components; said reflected green and blue light components impinge on a polarizing beam splitter, which reflects a green s-polarized light component and said blue light component, wherein said green s-polarized light component and said blue light component impinge said red-reflecting dichroic filter, which transmits said green s-polarized light component and a blue s-polarized light component to said projection system; and wherein said reflected red light component impinges another polarizing beam splitter, which transmits a red s-polarized light component through said half-wave plate, which changes said red s-polarized light component to a red p-polarized light component, which red p-polarized light component impinges said red-reflecting dichroic filter and is reflected to said projection system.

3. A projection display system using polarized light comprising:
(a) a light source for generating a light beam having at least three light components, wherein one of said light components is p-polarized and two of said light components are s-polarized;
(b) a projection system having plural polarizing beam splitters and dichroic filters therein, wherein each polarizing beam splitter and dichroic filter reflects one of said light components and transmits another of said light components and LCD panels, each LCD panel generating a light-component-specific image associated with each light component, wherein said polarizing beam splitters and said dichroic filters are arranged in a substantially x-shaped configuration, wherein said dichroic filters are normal to said polarizing beam splitters and arranged to intersect adjacent an edge thereof; and
(c) a projection lens for projecting an image combined from the light-component-specific images from the LCDs;
(d) wherein said light source includes a lamp and a filter stack having a cholesteric color filter mechanism located between said lamp and said projection system for pre-filtering said light beam.

4. A projection display system using polarized light comprising:
(a) a light source for generating a light beam having at least three light components, wherein one of said light components is p-polarized and two of said light components are s-polarized;
(b) a projection system having plural polarizing beam splitters and dichroic filters therein, wherein each polarizing beam splitter and dichroic filter reflects one of said light components and transmits another of said light components and LCD panels, each LCD panel generating a light-component-specific image associated with each light component, wherein said polarizing beam splitters and said dichroic filters are arranged in a substantially x-shaped configuration, wherein said dichroic filters are normal to said polarizing beam splitters and arranged to intersect adjacent an edge thereof; and
(c) a projection lens for projecting an image combined from the light-component-specific images from the LCDs;
(d) wherein said light beam from said light source impinges on a blue-transmitting dichroic filter at substantially 45 degrees, then impinges on a polarizing beam splitter at substantially 45 degrees, then impinges on an LCD panel having said light-component-specific image displayed thereon, substantially normal thereto, and is reflected therefrom carrying a color image component, then impinges a polarizing beam splitter at substantially 45 degrees, then impinges a blue-reflecting dichroic filter at substantially 45 degrees prior to transmitting said projection lens.

5. A projection display system using polarized light comprising:
(a) a light source for generating a light beam having at least three light components, wherein one of said light components is p-polarized and two of said light components are s-polarized;

(b) a projection system having plural polarizing beam splitters and dichroic filters therein, wherein each polarizing beam splitter and dichroic filter reflects one of said light components and transmits another of said light components and LCD panels, each LCD panel generating a light-component-specific image associated with each light component, wherein said polarizing beam splitters and said dichroic filters are arranged in a substantially x-shaped configuration, wherein said dichroic filters are normal to said polarizing beam splitters and arranged to intersect adjacent an edge thereof; and (c) a projection lens for projecting an image combined from the light-component-specific images from the LCDs;

(d) wherein said light source includes a lamp for generating said light beam and a pre-filtering illumination mechanism located between said lamp and said projection system from pre-filtering said light beam to provide a red p-polarized light component, a green s-polarized light component and a blue s-polarized light component to said projection system, wherein said pre-filtering illumination mechanism includes:

a red-transmitting dichroic filter, a pair of polarizing beam splitters, a pair of light absorbing stops, a half-wave plate, and a red-reflecting dichroic filter;

wherein said light beam impinges said red-transmitting dichroic filter, wherein said light beam is split into a reflected red light component and transmitted green light and blue light components; said reflected green and blue light components impinge on a polarizing beam splitter, which reflects a green s-polarized light component and said blue light component, wherein said green s-polarized light component and said blue light component impinge said red-reflecting dichroic filter, which transmits said green s-polarized light component and a blue s-polarized light component to said projection system; and wherein said reflected red light component impinges another polarizing beam splitter, which transmits a red s-polarized light component through said half-wave plate, which changes said red s-polarized light component to a red p-polarized light component, which red p-polarized light component impinges said red-reflecting dichroic filter and is reflected to said projection system.

6. A projection display system using polarized light, comprising:

(a) a light source for generating a light beam having at least two light components, wherein said light components are polarized and at least one of said light components is polarized differently than another of said light components and said one of said light components has a color that is different than said another of said light components;

(b) a projection system having a plurality of polarized light modulators, each modulator generating a light-component-specific image associated with one of said light components; and (c) a projection lens for projecting an image combined from the light-component-specific images from said modulators;

(d) wherein said light source includes a lamp and a filter stack having a cholesteric color filter mechanism located between said lamp and said projection system for pre-filtering said light beam to transmit red p-polarized light, green s-polarized light and blue s-polarized light.

7. A projection display system using polarized light comprising:

(a) a light source for generating a generally white light beam having at least two light components, wherein said light components are polarized and at least one of said light components is polarized differently than another of said light components, and said at least two components are provided to a projection system as a single beam, wherein the one light component and the other light component are within a single light beam, and said one light component has a different color than said other light component;

(b) said projection system having plural polarizing beam splitters and dichroic filters therein, wherein each polarizing beam splitter and dichroic filter reflects at least one of said light components and transmits at least another of said light components and a plurality of LCD panels, each LCD panel generating a light-component-specific image associated with one of said light components; and (c) a projection lens for projecting an image combined from the light-component-specific images from the LCDs;

(d) wherein said light source includes a lamp and a filter stack having a cholesteric color filter mechanism located between said lamp and said projection system for pre-filtering and light beam to transmit red p-polarized light, green s-polarized light and blue s-polarized light.

8. A projection display system using polarized light comprising:

(a) a light source for generating a generally white light beam having at least two light components wherein said light components are polarized and at least one of said light components is polarized differently than another of said light components, and said at least two components are provided to a projection system as a single beam, wherein the one light component and the other light component are within a single light beam, and said one light component has a different color than said other light component;

(b) said projection system having plural polarizing beam splitters and dichroic filters therein, wherein each polarizing beam splitter and dichroic filter reflects at least one of said light components and transmits at least another of said light components and a plurality of LCD panels, each LCD panel generating a light-component-specific image associated with one of said light components; and (c) a projection lens for protecting an image combined from the light-component-specific images from the LCDs;

(d) wherein said light source includes a lamp for generating said light beam and a pre-filtering illumination mechanism located between said lamp and said projection system for pre-filtering and said light beam to provide a red p-polarized light component to said projection system, wherein said pre-filtering illuminating mechanism includes a red-transmitting dichroic filter, a pair of polarizing beam splitters, a pair of light absorbing stops, a half-wave plate, and red-reflecting dichroic filter; wherein said light beam impinges on red-transmitting dichroic filter, wherein said light beam is split into a reflected red light component and transmitted green light and blue light components; said reflected green and blue light components impinge on a polarizing beam splitter, which reflects a green s-polarized light component and said blue light component, wherein said green s-polarized light component and said blue light component impinge said red-reflecting dichroic filter, which transmits said green s-polarized light component and a blue s-polarized light component to said projection system; and wherein said reflected red light component impinges another polarizing beam splitter, which transmits a red-s-polarized light component through said half-wave plate, which changes said red s-polarized light component to a red p-polarized light component, which red p-polarized light component impinges said red-reflecting dichroic filter and is reflected to said projection system.

9. A projection display system using polarized light comprising:
(a) a light source for generating a light beam having at least three light components, wherein one of said light components is s-polarized and two of said light components are p-polarized;
(b) a projection system having plural polarizing beam splitters and dichroic filters therein, wherein each polarizing beam splitter and dichroic filter reflects one of said light components and transmits another of said light components and LCD panels, each LCD panel generating a light-component-specific image associated with each light component, wherein said polarizing beam splitters and said dichroic filters are arranged in a substantially X-shaped configuration, wherein said dichroic filters are normal to said polarizing beam splitters and arranged to intersect adjacent an edge thereof; and
(c) a projection lens for projecting an image combined from the light-component-specific images from the LCDs, wherein said light source includes a lamp and a filter stack having a cholesteric color filter mechanism located between said lamp and said projection system for pre-filtering said light beam.

10. A projection display system using polarized light comprising:
(a) a light source for generating a light beam having at least three light components, wherein one of said light components is s-polarized and two of said light components are p-polarized;
(b) a projection system having plural polarizing beam splitters and dichroic filters therein, wherein each polarizing beam splitter and dichroic filter reflects one of said light components and transmits another of said light components and LCD panels, each LCD panel generating a light-component-specific image associated with each light component, wherein said polarizing beam splitters and said dichroic filters are arranged in a substantially X-shaped configuration, wherein said dichroic filters are normal to said polarizing beam splitters and arranged to intersect adjacent an edge thereof; and
(c) a projection lens for projecting an image combined from the light-component-specific images from the LCDs, wherein said light beam from said light source impinges on a blue-transmitting dichroic filter at substantially 45 degrees, then impinges on a polarizing beam splitter at substantially 45 degrees, then impinges on an LCD panel having said light-component-specific image displayed thereon, substantially normal thereto, and is reflected therefrom carrying a color image component, then impinges a polarizing beam splitter at substantially 45 degrees, then impinges a blue-reflecting dichroic filter at substantially 45 degrees prior to transmitting said projection lens.

11. A projection display system using polarized light, comprising:
(a) a light source for generating a generally white light beam having at least two light components, wherein said light components are polarized and at least one of said light components is polarized differently than another of said light components, and said at least two light components are provided to a projection system as a single beam;
(b) said projection system having a plurality of polarized light modulators, each modulator generating a light-component-specific image associated with one of said light components; and
(c) a projection lens for projecting an image combined from the light-component-specific images from said modulators, wherein said light source includes a lamp and filter stack having a cholesteric color filter mechanism located between said lamp and said projection system for pre-filtering said light beam to transmit red p-polarized light, green s-polarized light and blue s-polarized light.

12. A projection display system using polarized light comprising:
(a) a light source for generating a light beam having at least two light components, wherein said light components are polarized and at least one of said light components is polarized differently than another of said light components;
(b) a projection system having plural polarizing beam splitters and dichroic filters therein, wherein each polarizing beam splitter and dichroic filter reflects at least one of said light components and transmits at least another of said light components and a plurality of LCD panels, each LCD panel generating a light-component-specific image associated with one of said light components;
(c) a projection lens for projecting an image combined from the light-component-specific images from the LCDs; and
(d) wherein said light source includes a lamp and a filter stack having a cholesteric color filter mechanism located between said lamp and said projection system for pre-filtering said light beam to transmit red p-polarized light, green s-polarized light and blue s-polarized light.

13. A projection display system using polarized light comprising:
(a) a light source for generating a light beam having at least two light components, wherein said light components are polarized and at least one of said light components is polarized differently than another of said light components;
(b) a projection system having plural polarizing beam splitters and dichroic filters therein, wherein each polarizing beam splitter and dichroic filter reflects at least one of said light components and transmits at least another of said light components and a plurality of LCD panels, each LCD panel generating a light-component-specific image associated with one of said light components;
(c) a projection lens for projecting an image combined from the light-component-specific images from the LCDs; and (d) wherein said light source includes a lamp for generating said light beam and a pre-filtering illumination mechanism located between said lamp and said projection system for pre-filtering said light beam to provide a red p-polarized light component to said projection system, wherein said pre-filtering illuminating mechanism includes:

a red-transmitting dichroic filter, a pair of polarizing beam splitters, a pair of light absorbing stops, a half-wave plate, and a red-reflecting dichroic filter;

wherein said light beam impinges said red-transmitting dichroic filter, wherein said light beam is split into a reflected red light component and transmitted green light and blue light components; said reflected green and blue light components impinge on a polarizing beam splitter, which reflects a green s-polarized light component and said blue light component, wherein said green s-polarized light component and said blue light component impinge said red-reflecting dichroic filter, which transmits said green s-polarized light component and a blue s-polarized light component to said projection system; and wherein said reflected red light component impinges another polarizing beam splitter, which transmits a red s-polarized light component through said half-wave plate, which changes said red s-polarized light component to a red p-polarized light component, which red p-polarized light component impinges said red-reflecting dichroic filter and is reflected to said projection system.

14. A projection display system using polarized light, comprising:

(a) a light source for generating a light beam having at least two light components, wherein said light components are polarized and at least one of said light components is polarized differently than another of said light components;

(b) a projection system having a plurality of polarized light modulators, each modulator generating a light-component-specific image associated with one of said light components;

(c) a projection lens for projecting an image combined from the light-component-specific images from said modulators; and (d) wherein said light source includes a lamp and a filter stack having a cholesteric color filter mechanism located between said lamp and said projection system for pre-filtering said light beam to transmit red p-polarized light, green s-polarized light and blue s-polarized light.

15. A projection display system using polarized light, comprising:

(a) a light source for generating a light beam having at least two light components, wherein said light components are polarized and at least one of said light components is polarized differently than another of said light components;

(b) a projection system having a plurality of polarized light modulators, each modulator generating a light-component-specific image associated with one of said light components;

(c) a projection lens for projecting an image combined from the light- component-specific images from said modulators; and (d) wherein said light source includes a polarization converter, and wherein said polarization converter has a first dichroic filter and a second filter complimentary to said first dichroic filter, and wherein each dichroic filter is sandwiched between two quarter waveplates.

* * * * *